United States Patent
Shilo et al.

(10) Patent No.: US 9,503,520 B2
(45) Date of Patent: Nov. 22, 2016

(54) APPLICATION SYNCHRONIZATION AMONG MULTIPLE COMPUTING DEVICES

(71) Applicant: CONDUIT LTD., Ness Ziona (IL)

(72) Inventors: Ronen Shilo, Gedera (IL); Harel Tayeb, Shoham (IL); Suriel Benhadan, Efrat (IL); Eran Zinman, Tel Aviv (IL)

(73) Assignee: CONDUIT LTD., Ness Ziona (IL)

( * ) Notice: Subject to any disclaimer, the term of this patent is extended or adjusted under 35 U.S.C. 154(b) by 479 days.

(21) Appl. No.: 13/831,461

(22) Filed: Mar. 14, 2013

(65) Prior Publication Data

US 2013/0275553 A1 Oct. 17, 2013

Related U.S. Application Data

(63) Continuation-in-part of application No. 13/366,418, filed on Feb. 6, 2012.

(51) Int. Cl.
| | |
|---|---|
| G06F 15/16 | (2006.01) |
| H04L 29/08 | (2006.01) |
| G06F 9/445 | (2006.01) |

(52) U.S. Cl.
CPC ............. *H04L 67/1095* (2013.01); *G06F 8/61* (2013.01)

(58) Field of Classification Search
CPC .......... G06F 8/61; G06F 8/71; G06F 3/0481; H04L 67/10
USPC ................................... 709/248; 717/174–178
See application file for complete search history.

(56) References Cited

U.S. PATENT DOCUMENTS

| | | | | |
|---|---|---|---|---|
| 6,006,034 | A * | 12/1999 | Heath ....................... | G06F 8/65 717/170 |
| 7,386,855 | B2 * | 6/2008 | Song ....................... | H04L 29/06 719/310 |
| 2005/0154759 | A1 * | 7/2005 | Hofmeister ............... | G06F 8/61 |
| 2006/0259521 | A1 * | 11/2006 | Armenta ........... | G06F 17/30194 |
| 2007/0083906 | A1 * | 4/2007 | Welingkar ......... | H04N 21/4126 725/110 |
| 2009/0241104 | A1 * | 9/2009 | Amiga et al. ................. | 717/174 |
| 2009/0249359 | A1 * | 10/2009 | Caunter ............... | G06F 9/4448 719/315 |
| 2010/0262953 | A1 * | 10/2010 | Barboni et al. ............... | 717/120 |
| 2011/0072089 | A1 * | 3/2011 | Broman ................. | H04L 67/34 709/206 |
| 2011/0154255 | A1 * | 6/2011 | Ryu ...................... | H04W 4/008 715/810 |
| 2011/0289155 | A1 * | 11/2011 | Pirnazar ............ | G06F 17/30873 709/206 |
| 2012/0203862 | A1 * | 8/2012 | Tayeb et al. ................... | 709/217 |

* cited by examiner

*Primary Examiner* — Duyen Doan
(74) *Attorney, Agent, or Firm* — Tutunjian & Bitetto, P.C.

(57) ABSTRACT

A system and method for utilizing a server to synchronize launchers between a smartphone and a browser running on a personal computer of a user. When the user installs an application on his smartphone, the application's icon also appears automatically on a toolbar of the browser. The toolbar visually resembles the screen of the smartphone, and opening the icon of the toolbar launches, on the personal computer, a program that is identical or equivalent to the application installed on the smartphone.

9 Claims, 16 Drawing Sheets

APPLICATION SYNCHRONIZATION AMONG MULTIPLE COMPUTING DEVICES

REFERENCE TO RELATED APPLICATIONS

The present application is a Continuation in Part of U.S. application Ser. No. 13/366,418, filed Feb. 6, 2012, which claims the benefit of U.S. Provisional Patent Application Ser. No. 61/440,969, filed Feb. 9, 2011, entitled "Application Synchronization Among Multiple Computing Devices", the disclosures of which are hereby incorporated by reference and priority of which is hereby claimed pursuant to 37 CFR 1.78(a) (4) and (5)(i).

BACKGROUND

Field

The present disclosure relates to multiple-platform computing, and in particular to synchronizing installed applications among computing devices that are based on different platforms.

Description of Related Art

A variety of personal computing devices are available today, and many users have more than one computing device, to be used according to the circumstances. For example, a user may have a desktop computer with a large keyboard and screen for the office or at home, a notebook computer for traveling, and a mobile telephone to carry on his person as he goes about his daily routine.

Often, a user may desire to access the same content and functionalities via different computing devices. For example, a user may want to have his address book accessible via his desktop computers, portable computer, and mobile telephone; his work files and applications to be accessible also from home; and his electronic books accessible for reading via all his computing devices.

There are two common approaches for allowing users to access their content across a variety of computing devices: the first approach is routine synchronization, where content files added or updated on one device are copied to the other devices via device-to-device communication; the second approach is storing the user's content on a server (AKA in the cloud, and accessing that content from all computing devices via Web browsers or dedicated applications.

Users benefit not only from having access to content, which includes collections of data, but also from applications, which offer functionalities via user interfaces that allow the user to benefit from those functionalities. Applications are generally implemented as computer-executable code that is specific to a particular computing device and/or operating system. Therefore, saying that the same application is installed on different computing devices is taken to mean that the same or similar program title, functionalities, and user interface are common to the different computing devices, while the respective computer-executable code may be different for each computing device. Functionalities and user interfaces may be similar yet different across computing devices, due to different characteristics of the physical input and output devices, processing power, and communication capabilities.

With a flood of application and computing device offerings, users may often lose track of the applications installed on their different computing devices, and thus lack certain desired functionalities when they need or want them, or when updates are available for different platform versions of an installed application. Other users may find the routine installation of applications on multiple computing devices time consuming and inconvenient.

SUMMARY

The present disclosure relates to systems and methods for synchronizing applications across multiple computing devices of a user, including devices based on different hardware and different operating systems.

DEFINITIONS

The term "computing device" herein denotes data processing devices including, but not limited to: desktop computers; portable computers, such as notebook ("laptop") computers; mobile (cellular) telephones; tablet computers; and electronic book readers.

The term "application" means a collection of functionalities offered to a user of a computing device. Non-limiting examples of applications include a word processor, an electronic calendar, and a computer game. Certain applications are specialized for particular narrow use, often having only a small set of functionalities. An application, notably a specialized application, is sometimes referred to as an "app" for brevity.

The term "passive data" includes any data which is not intended to be executed by a processor of a computing device. Non-limiting examples of passive data include: documents, graphics, photographs, videos, audio files, motion pictures, data files, and the like. Most web content, including interactive screen displays, is passive data. Data files containing passive data are distinct from applications which contain executable code that is intended to be executed by a specific class or type of processor of a computing device.

As previously noted, an application may be offered for more than one type of a computing device, in which case the features and/or user interface may be adapted to the characteristics of the respective computing devices and still be considered the same application. For example, the user interface and features of a mobile phone platform version of a certain spreadsheet application may offer a reduced set of functionalities in comparison to the desktop computer platform version, yet be considered the same application.

Platform Versions

Although users want functional interchangeability for an application on various different computing devices, the different devices may be based on different, and often incompatible, data processing hardware and/or operating systems. For example, the instruction set of the processor of a user's personal computer is typically different from that of the processor of the user's mobile telephone. In addition, considerations of size of the input/output devices associated with different devices mean that input/output features of an application often need to be adjusted to the characteristics of the devices on which the application runs. For example, the relatively large display and tactile keyboard of a desktop computer is better-suited to elaborate text editing than the small screen and "soft" keyboard of a mobile telephone. Consequently, an application may also need to be separately adapted to the input/output characteristics of each computing device on which the application runs. Because of these factors, applications typically appear in different "platform versions" designed and configured for different types of computing devices having substantially different hardware and/or operating systems.

The terms "platform version" and "platform versions" refer to the executable code of a particular application as adapted to different computing devices having different hardware processors and/or different input/output configurations—the hardware and/or operating system configuration of a particular class of computing device is typically referred to as the "computing platform" or "platform" of that class. Executable code is typically specific to a particular platform; different platforms require application software having corresponding compatible executable code. Platform versions are typically identified by the specific platform for which they are intended. In a non-limiting example, the same application may be available in a "Windows" platform version, an "Apple" platform version, a "Linux" platform version, an "iOS" platform version, and an "Android" platform version. In broader examples, the same application may be available in a "computer" platform version and a "phone" platform version. In many cases, applications are available to users in different platform versions for the different computing devices they own.

Different platform versions of an application typically share the same application name, similar primary features, and have the ability to access, read, and write data files having the same or compatible data format and protocol, so that data files created by the application running on one platform are accessible by that same application running on different platforms.

Release Versions

In contrast to platform versions, as discussed above, software vendors typically denote different releases of applications for the same computing device as being of different "release versions", based on their functionalities and sometimes on the format of their data files for a particular software development release. For example, a software vendor may initially offer a particular application in a release version "1.0", and later upgrade the functionality for the application in a subsequent release to a release version "2.0". Generally, more recent release versions have expanded functionality and better performance than earlier release versions, and users are encouraged to upgrade to the newer release versions as they become available. It is stressed that the concept of a "platform version" of an application is completely distinct from the concept of a "release version", and the platform version of an application is independent of the release version of the same application. The terms are not mutually exclusive, and a "platform version" of a particular application typically also has a "release version". In different contexts, both the platform version and the release version are often referred to simply as "versions" of the application. To avoid confusion in discussions in the present disclosure, the full terms "platform version" and "release version" are used herein. (In the drawings, however, for compactness only the term "version" is used.)

The term "application title" means user-recognizable information that identifies an application to a computer user. The application title will usually be in the form of an application name, a graphical icon, or both. An application title is "opened", "executed" or "run" when the user selects it and orders the operating system to run the respective application, for example by clicking, double-clicking, tapping, selecting and calling an open or run command from a menu or list, or entering a text command in an entry field designated to receive user commands to the operating system.

The terms "application launcher" and "launcher" mean a collection of multiple application titles displayed to the user, along with links to functional code (such as located in the computing device's operating system or in a remote server) which together allow the user to identify an application title, and to select and open it. Non-limiting launcher styles include: a window displayed on the screen which shows multiple application icons; a list of application titles, such as a drop-down list; and a toolbar included in an Internet browser or another program, with buttons for opening the applications. All of these allow the user to select and open a desired application. A launcher may recursively include also one or more titles of other launchers, that, when any of them is selected and opened, will display another launcher. Also, a launcher may include one or more titles that allow access to file folders or other windows. It is noted, however, that the present discussion focuses principally on the application titles included within a launcher. The present discussion also relates to other titles that optionally allow access to launchers or folders, in addition to application titles.

The terms "application program", "program", and "application software" mean non-transitory computer-executable code that is stored in machine-readable storage of a computing device and which runs on the processor of the computing device for providing the functionalities of the respective application.

A particular application may be available in multiple different platform versions adapted to run on different computing devices and/or operating systems ("computing platforms"). Some programs, particularly those which are executed by Internet browsers, may be written in a platform-independent language, such as Java®, that runs on different computing platforms, obviating the need to provide different platform versions for different computing devices. Application programs for different platforms typically contain different executable code. Generally, an application will not run on a platform unless it is available in the correct platform version. Some applications referred to as "web programs" may be launched from a user's computing device and run on a processor of a remote server.

The present disclosure relates to a system and method for utilizing a server to synchronize application launchers among multiple computing devices of a user. When a user installs an application on a first computing device, the launcher(s) of at least one of his or her other computing devices are automatically updated. In at least one of the user's computing devices, the installation includes or is followed by downloading program code to execute on the computing device's processor.

Therefore, according to an embodiment of the present invention there is provided a method of operating at least one server for synchronizing applications between a first computing device that is based on a first computing platform and contains a first launcher for launching applications on the first computing device, and a second computing device that is based on a second computing platform and contains a second launcher for launching applications on the second computing device, wherein the first computing platform is different from the second computing platform, the method including: (a) presenting, to the first computing device, a plurality of application titles for selection, each application title associated with respective functionalities; (b) receiving, from the first computing device, a request for a selected application title of the plurality of application titles; (c) sending, to the first computing device, the selected application title to be added to the first launcher; (d) subsequent to the sending, automatically providing, to the second computing device, the selected application title to be added to the launcher of the second computing device; and (e) supplying, to each computing device of at least one computing device of the first computing device or the second computing device, an application program, the application program containing code to be stored in a non-transitory storage device of said each computing device, wherein the application program is compatible with the computing platform of said each computing device for running on a processor of said each computing device to provide the functionalities associated with the selected application title.

In addition, according to another embodiment of the present invention, there is also provided a method of operating at least one server for synchronizing applications between a smartphone and a browser running on a personal computer, the browser including a browser toolbar that visually resembles a screen of the smartphone the method including: (a) sending, to the smartphone, a selected application title to be added to the smartphone launcher, the application title including an application icon to be presented on a screen of the smartphone; and (b) subsequent to the sending, automatically providing the application icon to the browser, to be added to the browser toolbar.

According to another aspect, the selected application title includes data allowing one or both of:

the first computing device selectably sending to the server(s) a request for the first program code, thereby initiating sending the first program code;

the second computing device selectably sending to the server(s) a request for the second program code, thereby initiating sending the second program code.

According to still another aspect, the selected application title includes data allowing a certain computing device, that is either the first computing device or the second computing device, to communicate with a remote server for running a program corresponding to the selected application title on the remote server to provide the functionalities associated with the selected application title via a user interface of the certain computing device.

The apparatus and method of the present innovation are optionally effective for synchronizing also at least one additional computing device, the additional computing device being synchronized by, upon connecting to the server, automatically sending the selected application title to the additional computing device for being added to the launcher of the additional computing device.

In that case, the selected application title may include data allowing the additional computing device to communicate with a remote server for running a program corresponding to the selected application title on the remote server to provide the functionalities associated with the selected application title via a user interface of the additional computing device.

BRIEF DESCRIPTION OF THE DRAWINGS

The present disclosure will be understood and appreciated more fully from the following detailed description, taken in conjunction with the drawings in which.

DETAILED DESCRIPTION

Launchers (Background Art)

Figure 1A:
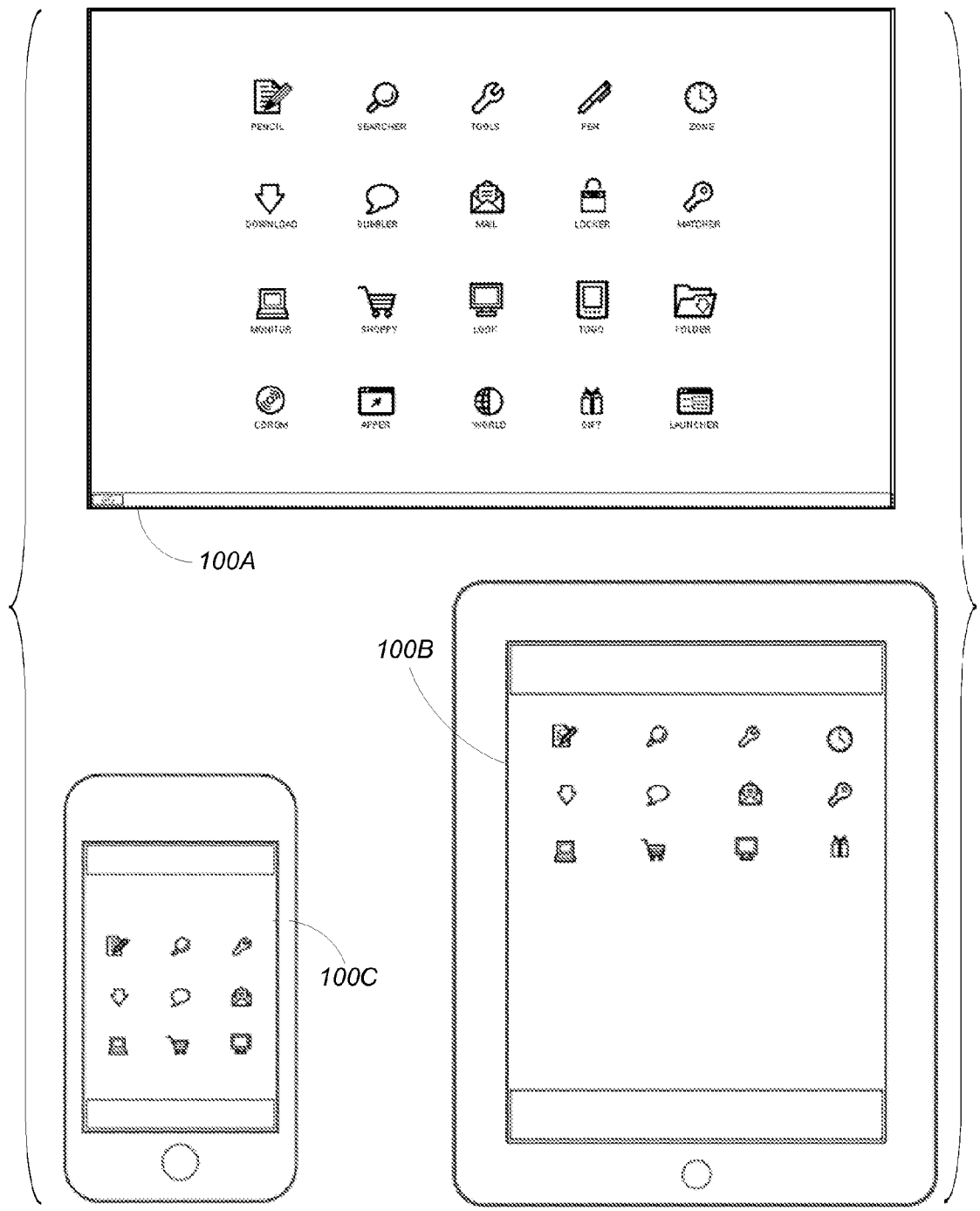
FIGS. 1A-1B include exemplary illustrations of user interfaces of launchers of the background art.
Figure 1B:
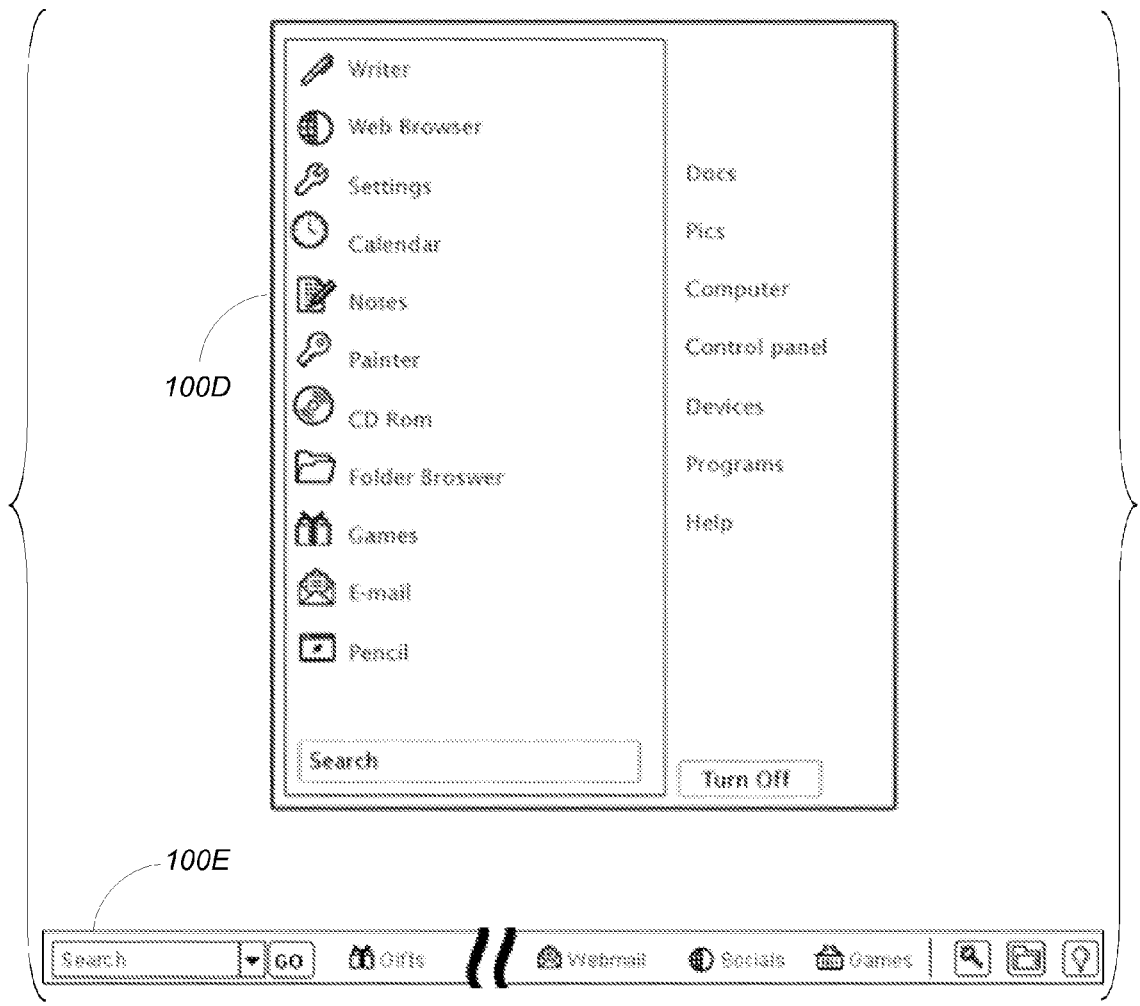

FIGS. 1A-1B illustrate common launcher user interfaces found in the background art, which are also usable in the context of the present innovation. It will be appreciated that the launcher interfaces of FIGS. 1A-1B are exemplary, and other embodiments of launcher interfaces exist or can be developed for providing the launcher functionality described in the definitions section above.

Launcher interface 100A is commonly found in popular operating systems, where a window displays a collection of icons, each icon accompanied by an application name, ready for the user to select and open. Launcher interface 100B is of the type commonly used in some tablet computers, while launcher interface 100C is of the type commonly used in popular smartphones. Launcher interface 100D represents another launcher interface available to users of popular operating systems. Launcher interface 100E, often termed a "toolbar", allows a user of one program, for example, an Internet browser, to launch other applications (such as an organizer, calculator, or game) without leaving the program.

It will be appreciated that often a single application can be accessed by a computer user via more than one launcher interface. For example, a user of a desktop computer may select to access a certain application via launcher interface 100A, launcher interface 100D or launcher interface 100E. Also, it will be noted that some of the titles included in a launcher may provide access to another launcher interface or to a folder.

Launcher Components (Background Art)

Figure 1C:
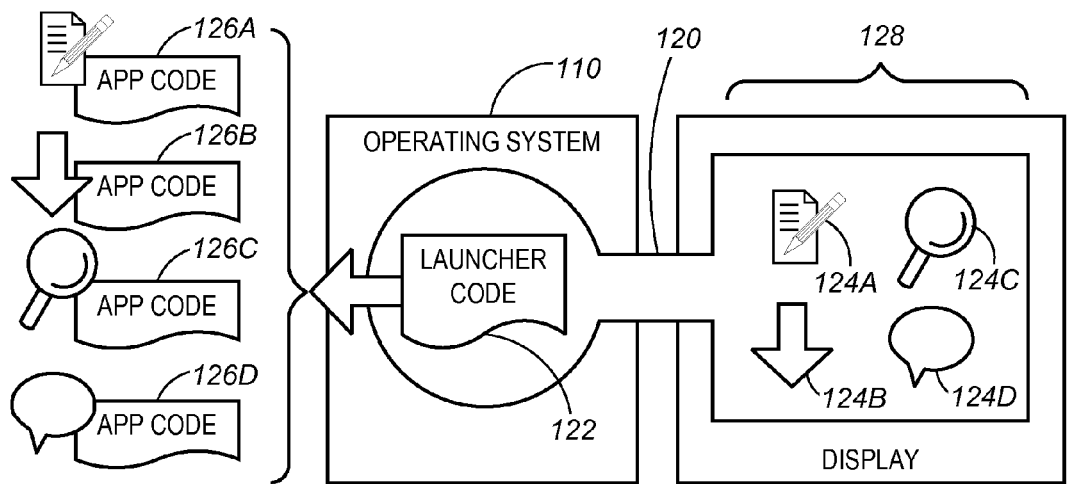
FIG. 1C conceptually illustrates the components of a background art launcher.

FIG. 1C conceptually illustrates the operational components of a launcher 120, which includes executable launcher code 122 embedded in operating system 110 and a user interface 128 containing application titles 124A, 124B, 124C, and 124D (illustrated as icons) for viewing on a display 130. When the user selects an application title via interface 128, launcher code 122 executes the respective executable application code 126A, 126B, 126C, or 126D. In this fashion, application titles 124A, 124B, 124C, and 124D serve as automatic links to the functionalities of their respective applications.

Figure 1D:
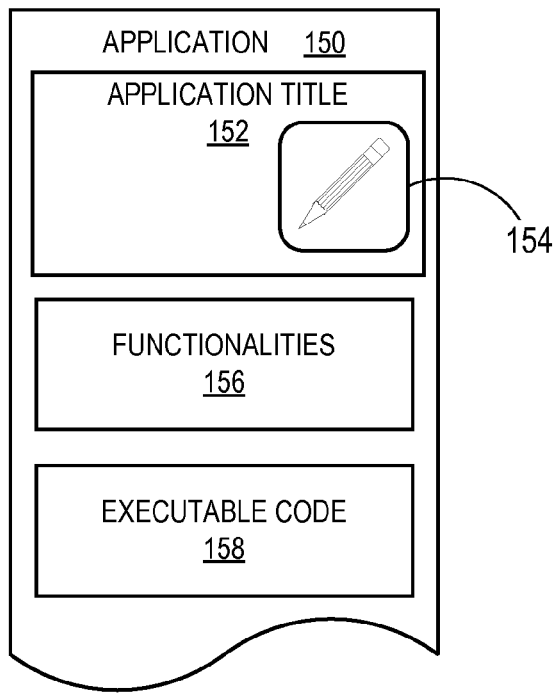
FIG. 1D conceptually illustrates the components of an application according to the background art.

FIG. 1D conceptually illustrates the components of an application 150 according to the background art. Application 150 includes an application title 152, typically incorporating an alphanumeric name and a graphical icon 154, a set of functionalities 156, and executable code 158. Application title 152 and functionality set 156 typically are highly uniform for application 150 across various computing platforms (see below), but executable code 158 is typically specific to the computing platform where application 150 is installed. Executable code 158 is also referred to as "application software", an "application program", or "program code".

Multiple Computing Devices of a User (Background Art)

Figure 2:
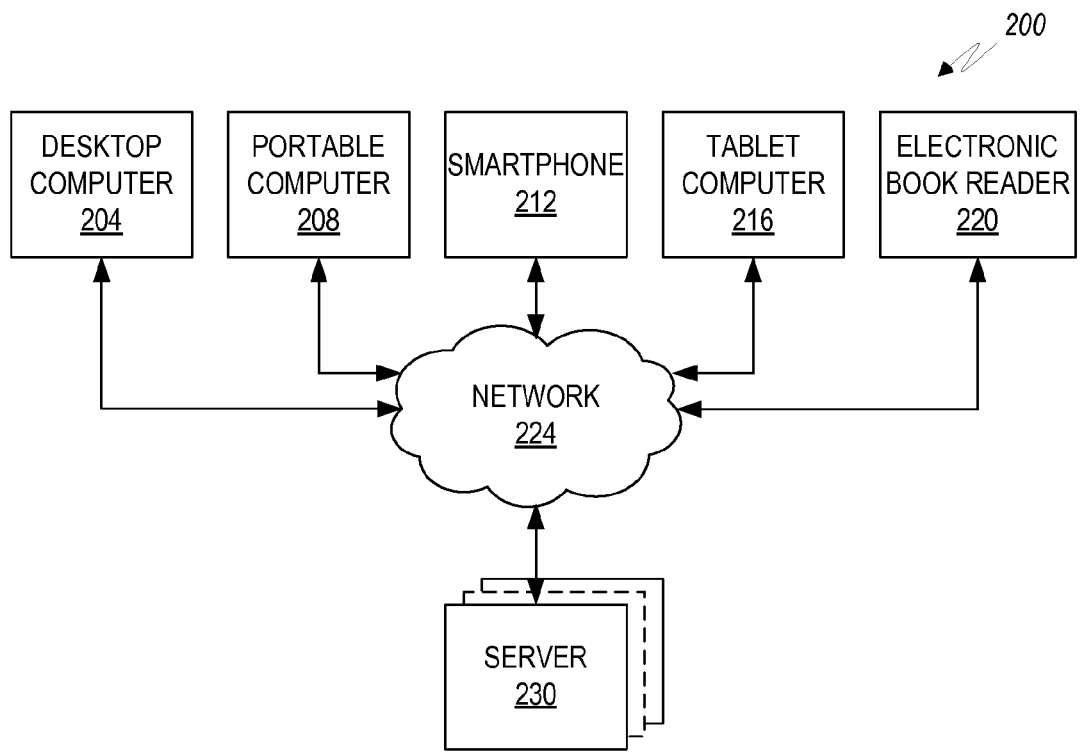
FIG. 2 is a simplified block diagram describing a typical layout of multiple computing devices of a user according to the background art.

Many users today own and use multiple computing devices. FIG. 2 depicts a common situation of a user that owns and uses a desktop computer 204, a portable computer 208, a smartphone 212, a tablet computer 216 and an electronic book reader 220. Most or all of the above computing devices can communicate via the Internet and/or mobile networks—collectively represented in FIG. 2 by a network 224—with multiple servers 230 that run applications that are beneficial to a user. Thus, the user of the example of FIG. 2 can use any of the computing devices 204-220 that he or she owns, as well as use remote computing devices—servers 230—which are accessible from computing devices 204-220 via network 224. Other types of user computing devices may become available and be employed by a user in the context of the present innovation.

Often a user wishes to use a certain application on more than one computing device, for example to play a certain game on desktop computer 204 at home and continue to play the same game on his smartphone 212 when commuting. In this example, the user may acquire and install the respective desktop platform and mobile platform versions of the game, and synchronize the current game status between the devices by connecting them via a direct interface or via the Internet.

Synchronization of status and data are also known, for example, in electronic book readers. A user may use a desktop computer 204 to purchase and read a certain electronic book, and then find it automatically available and even positioned at the current page, on electronic book reader 220. As another example of existing synchronization of data and/or status, data of a personal calendar, contact list and tasks is actually maintained on a server 230, and various user devices of 204-220 are used to access such data via network 224.

Launcher Synchronization

Users are offered a vast number of applications, many of them free of charge or for a low fee. Thus, many users download tens or even hundreds of applications, and may regularly use many of those applications. However, download is typically made using a single computing device, and the user's other computing devices often lack a corresponding installation of the application. According to present disclosure, application installation is synchronized among multiple computing devices owned by a user.

Synchronizing passive data requires only storing copies of the data on each device where it is desired. In contrast, synchronizing applications on launchers requires storing the correct platform version of the application's executable on each device where it is desired. In the present disclosure, however, some (but not all) of the user's computing devices are allowed to launch a certain application from the computing device's launcher, but the actual execution takes place in a remote server via the Internet (web program).

Launcher Synchronization Including Application Installation

Figure 3A:
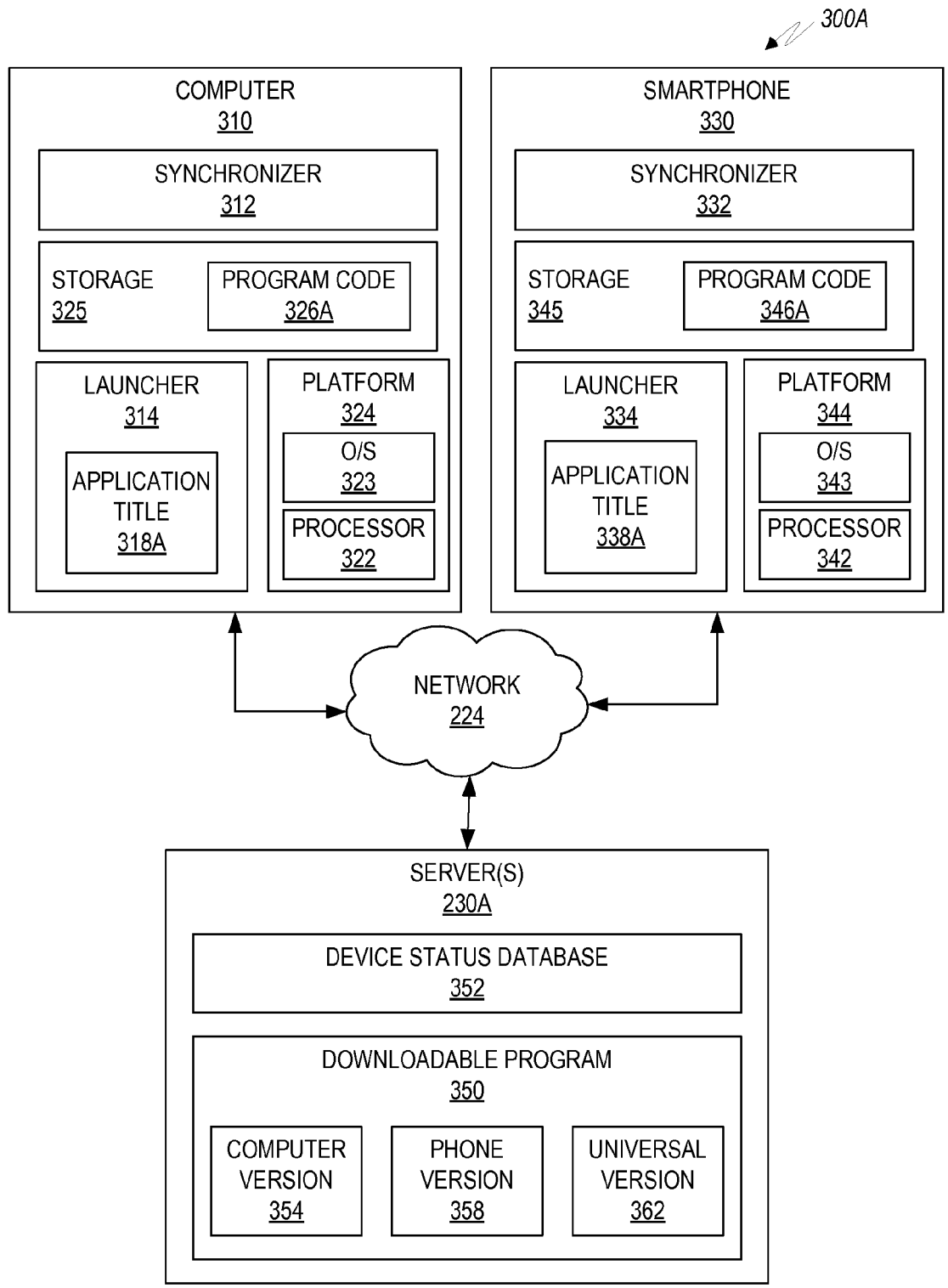
FIG. 3A is a simplified block diagram of a system according to an embodiment of the present innovation.

FIG. 3A illustrates a system 300A, where the application launchers on a computer 310 and a smartphone 330 are synchronized via one or more server(s) 230A.

Computer 310 is a desktop or laptop computer that includes a processor 322 for running programs. In this non-limiting example, processor 322 and its associated operating system ("O/S") 323 constitute a computing platform 324 for computer 310. In a similar fashion, smartphone 330 includes a processor 342 and an operating system 343, which constitute a computing platform 344 for smartphone 322.

The user uses computer 310 to connect with server(s) 230A for selecting and downloading to computer 310 a computer platform version 354 of downloadable program 350, which is further installed (possibly, upon approval of the user) and becomes available to run on processor 322, while the application title 318A that corresponds to the downloaded program is added to launcher 314. The installation process of program code 326A and application title 318A on computer 310 also involves an update of device status database 352 that is now aware that the current application is installed on computer 310. Such update is carried out either automatically by server(s) 230A upon providing the application for download, or is made upon the initiative of application synchronizer 312, which is a dedicated application that insures the synchronization between the applications downloaded to computer 310 and the status of launcher 314 of computer 310 in device status database 352.

According to the present disclosure, application synchronizer 332 of smartphone 330 is activated in any of the following cases: (i) upon smartphone 330 being turned on; (ii) by receiving a command from the user; or (iii) by periodic polling during continuous background operation when smartphone 330 is on. When application synchronizer 332 is activated, it communicates with device status database 352 on server(s) 230A and checks whether there is a need to update launcher 334 of smartphone 330 as a result of a corresponding update to any of the other computing devices of the user (in this case—an update of launcher 314 of computer 310). If application synchronizer 312 identifies a need for update, it activates the download of phone platform version 358 to smartphone 330, which causes, possibly after receiving the user's approval, the corresponding application title 338A to be added to launcher 334 of smartphone 330. Then, immediately or upon the first time that application title 338A is opened by the user, the corresponding program code 346A will be added to a nonvolatile (non-transient) storage device 345 of smartphone 330, ready to run on processor 342.

The user of the system 300A of FIG. 3A may alternatively use his or her smartphone 330 to select a certain application for downloading from server(s) 230A, and the process described above will be carried out as described above in this section while smartphone 330 and computer 310 swap roles. Thus, downloading the application to smartphone 330 will cause an update to device status database 352, which will cause application synchronizer 312 of computer 310 to download the respective computer platform version 354 of downloadable program 350 from server(s) 230A and add program code 326A to a nonvolatile (non-transient) storage device 325 of computer 310 and application title 318A to launcher 314.

Depending on the operating systems and computing environments of computer 310 and smartphone 330, it is possible that instead of having different computer platform version 354 and phone platform version 358, a single universal platform version 362 will be provided as both program code 326A and program code 346A, for example using code written in Java®. In this case, computer platform version 354 and phone platform version 358 may become redundant and be eliminated.

A synchronizer, such as synchronizer 312 and 332, can be an agent installed in the computing device, such as computer 310 and smartphone 330, respectively. In such cases, the agent works in cooperation with a program running on a server, such as server(s) 230A.

Launcher Synchronization Including a Two-Step Program Installation

Figure 3B:
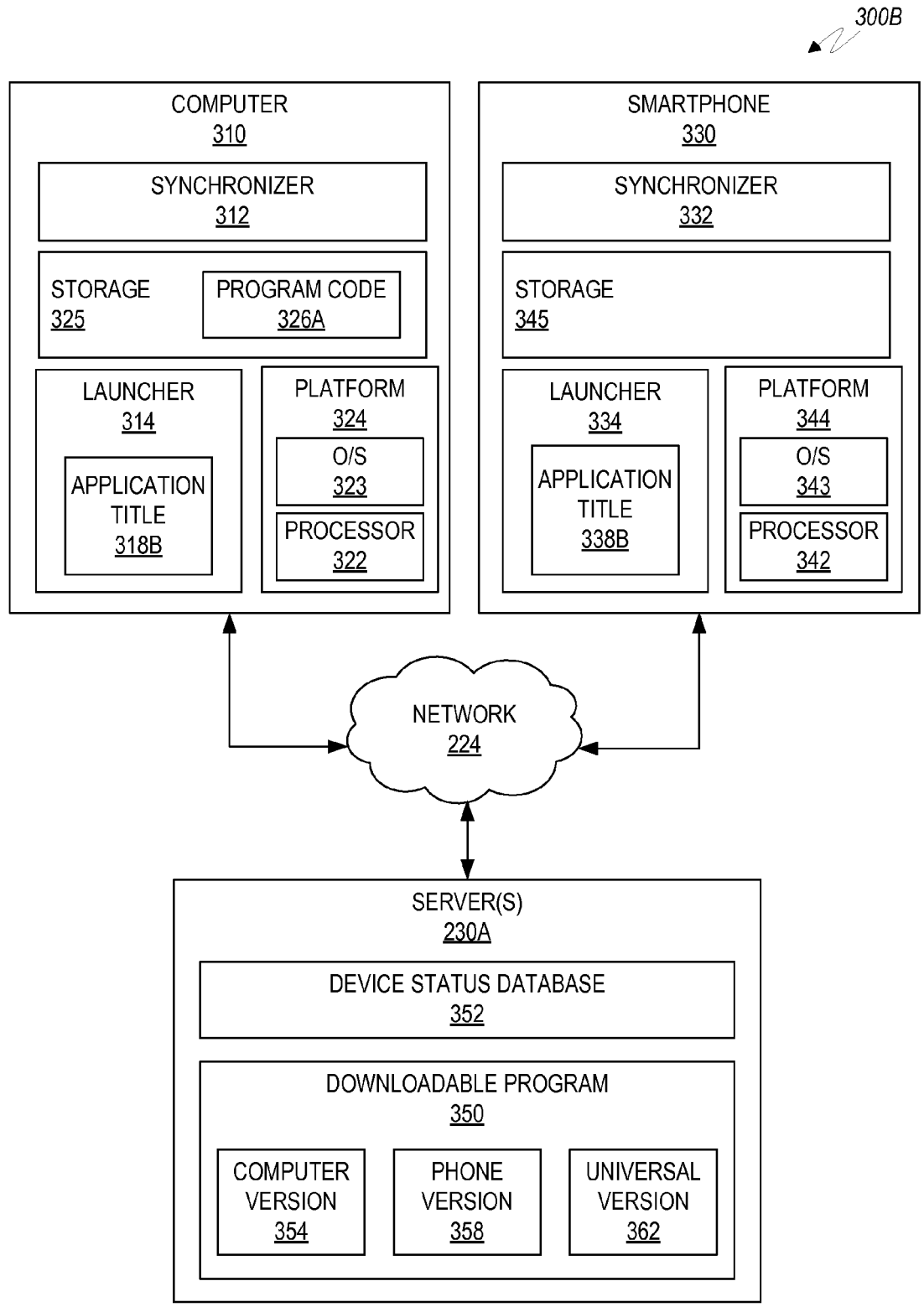
FIG. 3B is a simplified block diagram of a system according to another embodiment of the present innovation.

FIG. 3B illustrates a system 300B according to another embodiment that operates similarly to system 300A of FIG. 3A, except that program code 346A is not automatically downloaded by application synchronizer 332 upon synchronization, but only application title 338B is downloaded and added to launcher 334. Thus, the user who uses computer 310 to download from server(s) 230A either computer platform version 354 or universal platform version 362 and install it as program code 326A and application title 318B, causes an update to device status database 352, which causes application synchronizer 332 of smartphone 330 to download and install application title 338B, without installing the corresponding program code 346A as in FIG. 3A. Only when the user selects and opens application title 338B for the first time will the corresponding program code be downloaded from server(s) 230A and become locally available on smartphone 330 as in the embodiment of FIG. 3A.

An advantage of the embodiment of FIG. 3B over that of FIG. 3A is in that it allows automatic update of launcher 334 by the addition of application title 338B without requesting the user to approve the installation. For security reasons, automatic download of program code is normally considered risky and therefore requires explicit user approval, while merely providing a link for such a download, in the form of application title 338B, is not considered as risky and can be allowed to proceed automatically. Thus, while application title 338B may look identical or similar before and after the actual program code is downloaded, its role actually changes from a download link to a program execution button when the user selects and opens application title 338B.

Synchronization Between a Resident Program and a Web Program

Figure 3C:
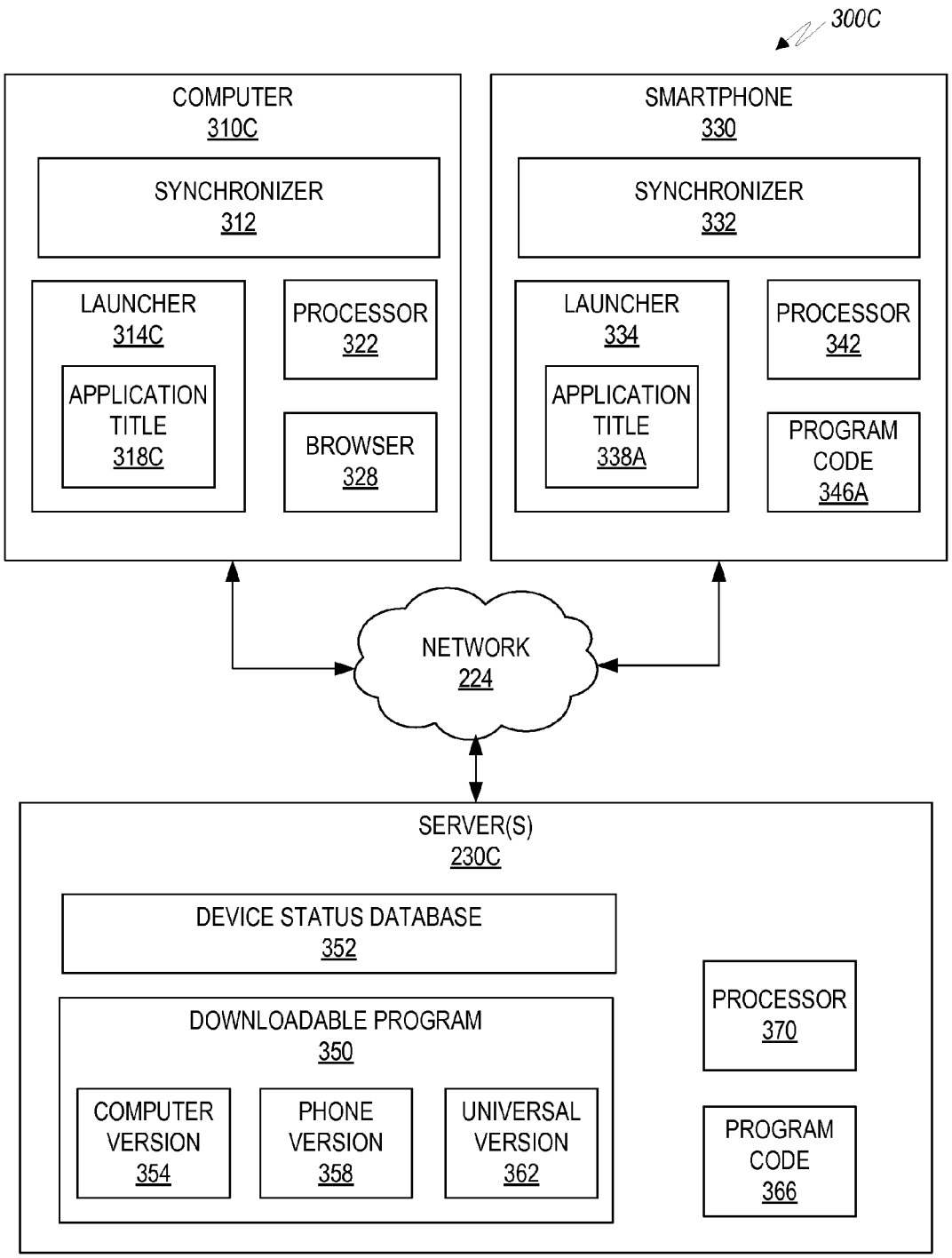
FIG. 3C is a simplified block diagram of a system according to an additional embodiment of the present innovation.

FIG. 3C illustrates a system 300C according to an embodiment that synchronizes applications running on computer 310C and smartphone 330 via server(s) 230C. The operation of system 300C is similar to the operation of system 300A of FIG. 3A, with the following differences: (i) computer 310C explicitly includes a browser 328; (ii) a launcher 314C is preferably in the form of a browser toolbar such as launcher 100E of FIG. 1B, integrated within the user interface and functionalities of browser 328, and an application title 318C is in the form of a button within that toolbar; (iii) server(s) 230C includes program code 366 that runs on a processor 370 for providing the user of computer 310 the functionalities related to application title 318C via browser 328, in other words, the user of computer 310 selects and opens application title 318C, and then runs the respective program as a Web application.

Thus, the user who owns both computer 310C and smartphone 330 may download a new application in one or two alternative methods according to the present disclosure. In the first method, the user operates computer 310C to select and download a new application, whose application title 318C is in the form of an added button to a toolbar (launcher 314C) of browser 328. This allows the user to benefit from the functionalities corresponding to application title 318C by interfacing via browser 328 and network 224 with processor 370 of server(s) 230C, and causing processor 370 to execute program code 366 and return results to browser 328. Upon downloading application title 318C, which is actually a toolbar button that includes a link to program code 366 on server(s) 230C, device status database 352 is updated, thereby causing application synchronizer 332 of smartphone 330 to download phone platform version 358 (or universal platform version 362) of downloadable program 350, as in the case of FIG. 3A. According to the second method, the user uses smartphone 330 to download the selected application title 338A and program code 346A to smartphone 330, which causes device status database 352 to be updated and further initiates the update of launcher 314C (toolbar of browser 328) to include the corresponding application title 318C (toolbar button) for allowing the user to run program code 366 on processor 370 via browser 328.

The embodiment of FIG. 3C allows the user to use a web application via the browser of his computer, benefiting from the high reliability and low (or zero) marginal cost of the Internet connection, while a corresponding application (possibly with a reduced set of functionalities) runs as a stand-alone application on his smart mobile phone even when Internet connection is unavailable (e.g. during flights), unreliable, or expensive (e.g., when roaming).

Types of Application Titles

Figure 4:
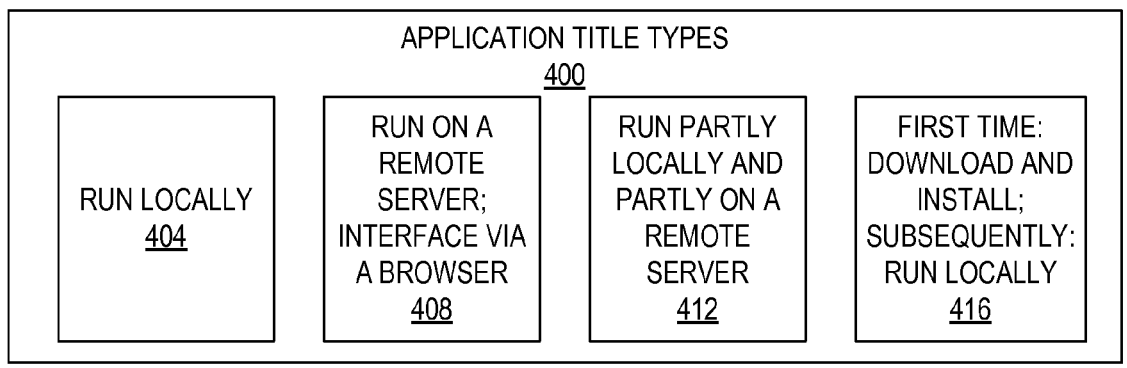
FIG. 4 is a simplified block diagram illustrating exemplary application title types that are usable within the context of the present innovation.

FIG. 4 demonstrates exemplary types of application titles within a launcher, generalizing and extending the roles of application titles 318A-318C of FIGS. 3A-C above.

A block 404 relates to an application title which activates program code that is installed on the computing device, which can run even when the computing device is disconnected from network 224.

A block 408 relates to an application title that is actually a link to an application that runs on a remote server, where the user interface is provided via an Internet browser running on the computing device; a typical example is a launcher in the form of a browser toolbar, where the application title is in the form of a button on that toolbar.

A block 412 relates to an example where an application title actually activates both a local program that runs on the computing device and cooperates via network 224 with a peer program running on a remote server; an example is a multi-party game that runs both on the players' computers and on an Internet server.

A block 416 relates to an application title installed automatically on a second computing device, upon the application synchronizer of the second computing device detecting, at a device status database on a server, that a corresponding application title has been installed on a first computing device of the user; in this case, the automatic installation preferably installs an application title in the form of an installation link, and only when the user opens the application title and activates it for the first time, will the application actually be installed. The role of the application title will then become a program execution button. It will be appreciated that the case of block 416 allows secure automatic installation of the application title, without requesting user approval, which will typically be deferred and requested the first time the user opens the application title. It will also be appreciated that upon automatically installing the application title in the launcher according to the example of block 416, the corresponding program code may be downloaded as an installation package and stored in a nonvolatile storage device of the computing device, ready for installation when the application title is opened for the first time; alternatively, the application code may be downloaded from a remote server and installed in the computing device only when the application title is opened for the first time.

General Case of Multiple Computing Devices

Figure 5:
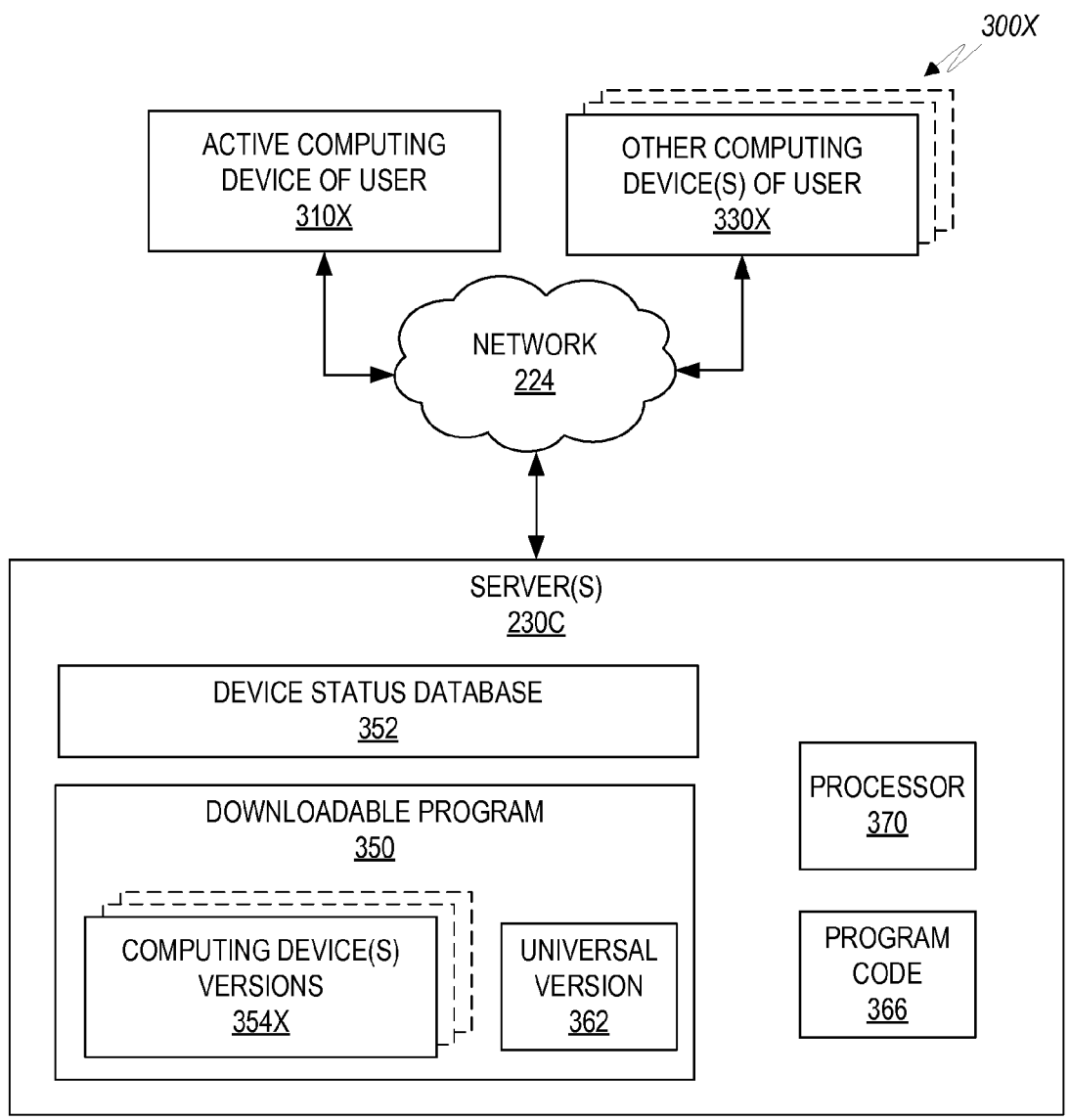
FIG. 5 is a simplified block diagram of a system according to an embodiment of the present innovation.

FIG. 5 depicts a general case, where a user owns a plurality of computing devices such as the computing devices of FIG. 2. The user's computing devices, collectively represented by blocks 310X and 330X, may differ by size, portability, utility and operating system. The user then uses any of his computing devices, identified as active computing device 310X, for downloading from server(s) 230C a new program title. The corresponding update of the launcher of active computing device 310X causes an update to the user's record in device status database 352, which will cause any of other computing device(s) 330X, upon connecting to server(s) 230C, to update its launcher by adding a corresponding application title, as exemplified above with reference to FIGS. 3A-3C. It is noted, however, that some computing devices of a user may not be updated under the above circumstances because of user preferences or unavailability of the corresponding platform version.

Device Status Database

Figure 6:
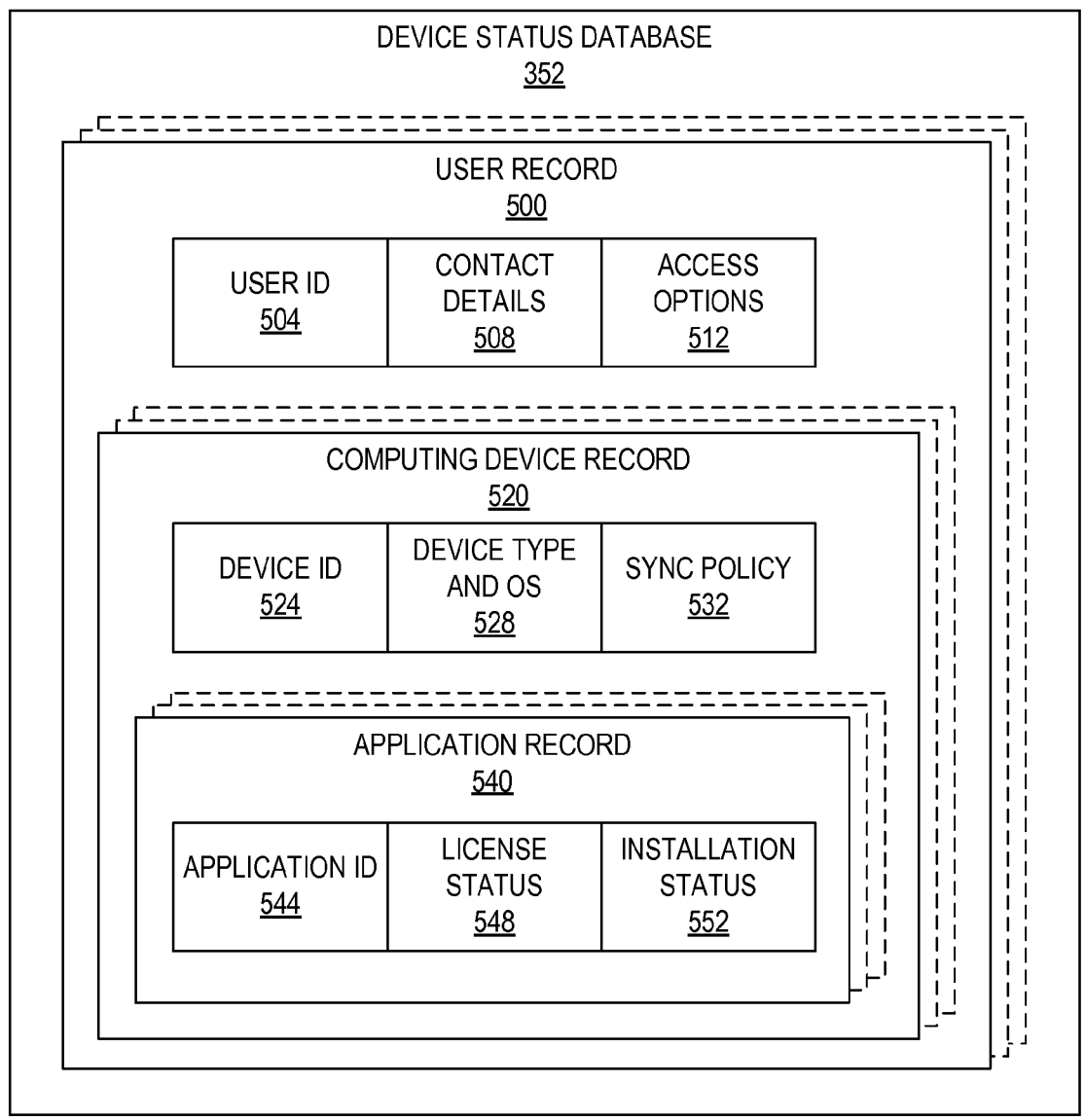
FIG. 6 is a simplified block diagram describing the components of a device status database according to an embodiment of the present innovation.

FIG. 6 illustrates an example of the content of device status database 352 that is maintained on a server as illustrated, for example, in FIGS. 3A-3C. Database 352 stores and updates a plurality of user records, represented in FIG. 6 by a user record 500 that is personal to a user who owns a plurality of computing devices, such as the devices of FIG. 2. User record 500 includes user-specific information, such as a unique user ID 504 that identifies the user, as well as user record 500, contact details 508 that allow connecting with the user in case of technical or subscription problems, and access options 512 includes the access rights, subscription arrangements and password used to allow computing devices owned by the user to add their respective record as a device record 520 and benefit from the launcher synchronization services according to the present innovation.

A computing device communicating for the first time with a synchronization server such as 230A and 230C of FIGS. 3A-3C, associates itself with user record 500 by presenting access options 512, and then establishes a device record 520, including a unique device ID 524, device type and OS (operating system) 528 and synchronization policy 532, which are either automatically derived from information available from the device and/or are explicitly entered by the user upon registering the new device with user record 500 of device status database 352. Synchronization policy 532 determines which platform version of software will be downloaded (for example, a personal computer or a smartphone, or according to the operating system, or a universal Java® platform version, or a link to a web application running on a remote server), and whether the download will include executable code installation or just a link for such installation.

Application record 540 is added to a device record 520 upon an application title being added to the launcher or the respective device, which happens either by the user explicitly installing an application on the device, or by the device's application synchronizer (such as application synchronizer 312 or application synchronizer 332 of FIGS. 3A-3C) initiating an application title installation upon detecting that a corresponding application has been registered in user record 500 when previously installed in another computing device of the user. Application record 540 includes a unique application ID 544 that identifies the application, license status 548 data that determines the user's application usage permissions, and installation status 552 data that indicates which platform version has been installed and whether the installation of the application title in the browser has been followed by the installation of the corresponding program code in the computing device's nonvolatile storage device.

Operation

Figure 7:
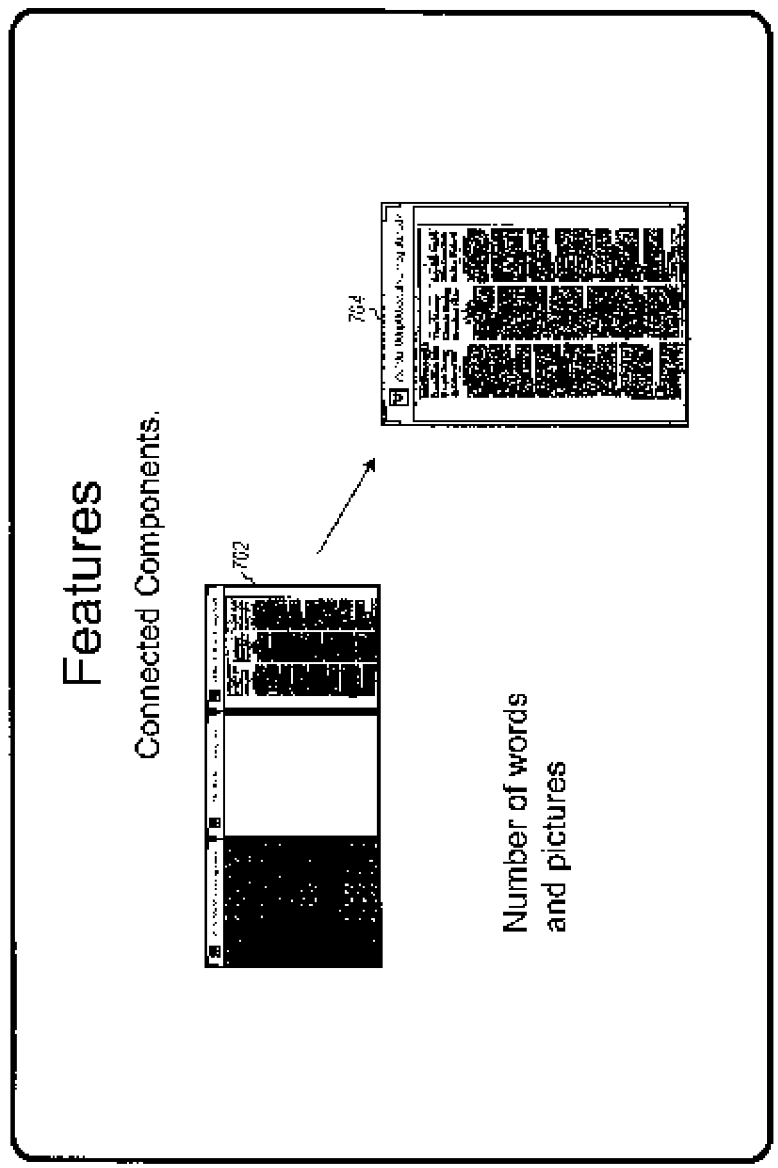
FIG. 7 is a simplified flowchart describing the operation of embodiments of the present innovation.

FIG. 7 illustrates a preferred mode of operation of the present innovation. In step 601 the user updates one of his or her computing devices (herein: first computing device), by installing a new application, thereby adding the respective application title to a launcher of the computing device. The installation may also include downloading the respective program code and storing it in a nonvolatile storage computing device of the first computing device, ready to load and execute on the processor of the computing device. In step 605 the synchronizer of the active computing device (such as application synchronizer 312 or application synchronizer 332 of FIGS. 3A-3C) is aware of the update and communicates with computing device status database 352 to add the new installed application to the active computing device's record in the database. In step 607 the server that hosts computing device status database 352 updates the records of all computing devices of the user that are registered in computing device status database 352 about the application added to the first computing device. In step 609, a second computing device of the user goes online (or has already been online upon the update of the first computing device), which causes in step 613 the synchronizer of the second computing device to communicate with computing device status database 352 and check the second storage computing device's record in computing device status database 352, which notifies the second storage computing device about the update, which causes the synchronizer of the second computing device, in step 617, to add the application title to a launcher of the second computing device.

In a step 621, the synchronizer of the second computing device selects one of the options 1-4, depending on the computing device's type and security policy, as well as by the nature of the installed program. Option 1 leads to a step 625, in which the respective program code, which matches the type and operating system of the second computing device, is downloaded and installed in a nonvolatile storage device of the second computing device. Option 1 is generally suitable for devices that need offline operability and where security provisions (e.g. validating the downloaded programs as trusted by a digital signature) afford automatic installation. Under option 2, a step 625 associates the application title with a link to an installer program, whose code is either downloaded and stored in a nonvolatile storage device of the second computing device, or is kept on a remote server; in both cases, the first time the user opens the application title, the user is notified about the forthcoming installation, and can decline, postpone or approve the installation; after the installation, the application title turns into a program-running button. Under option 3, which leads to a step 633, the program title in the installer is a link to a web application hosted on a remote server, where the second computing device serves as an input and output device for the user, possibly via a web browser. Option 4 leads to a step 637, where both dedicated local code and a remote server program will run cooperatively, for example in a multiplayer Internet game, where a local program manages graphic processing while the game rules and steps run on the server. In step 637, the local code may be downloaded automatically (as in step 625), or through a two-step process that prompt the user for approval upon the first time the application is opened (as in step 629).

It will be appreciated that the present innovation may also allow synchronizing launchers upon the user deleting an application title from one of his or her computing devices, which will cause the deletion of the corresponding application titles on other computing devices of the user. Such deletion may be preceded by prompting the user to confirm or decline the deletion operation, and may include also automatically uninstalling the respective program code.

For clarity and brevity, the description above focused on automatically or semi-automatically updating the launcher of a second computing device of a user in response to the user installing a program on a first computing device. The same mechanism can and is meant to synchronize any number of computing devices of the user, according to the devices operated by that user, the device and program types, and the user's and application provider's preferences.

It will be appreciated that synchronization of the launchers may sometimes be delayed, for example: (i) when a device is kept off or offline and will be synchronized only upon turning online; (ii) when a new device is purchased by the user and reported to the server; (iii) when a platform version compatible with a second computing device is issued later than the installation of the corresponding title on the first computing device.

Synchronization Between a Smartphone and a Browser

Certain embodiments of the present invention provide application launcher synchronization between a user's smartphone and a browser of the user's personal computer, as disclosed herein.

According to these embodiments, a "smartphone" is a cellular telephone having advanced computing capabilities built on a mobile operating system, and having a touch-screen for viewing and launching apps. Also according to these embodiments, a "personal computer" is a general-purpose computer operated directly by an end-user with no intervening computer operator, and having an Internet connection and running an Internet browser application (denoted herein as a "browser"). Personal computers include desktop personal computers, portable personal computers (also known as "notebook" computers and/or "laptop" computers), and tablet-style personal computers.

Also according to these embodiments, a browser may have functionalities relating to synchronization of applications (or "apps") with a smartphone as disclosed herein, wherein the functionalities are furnished and/or enabled by any of several means, including, but not limited to: native software code of the browser; and enhanced functionalities through the use of extension software common denoted as an "add-in", an "add-on", and a "plug-in". According to these embodiments, the capabilities of synchronizing applications with the smartphone are considered to be capabilities of the browser itself regardless of how the browser acquires the capabilities.

Figure 8:
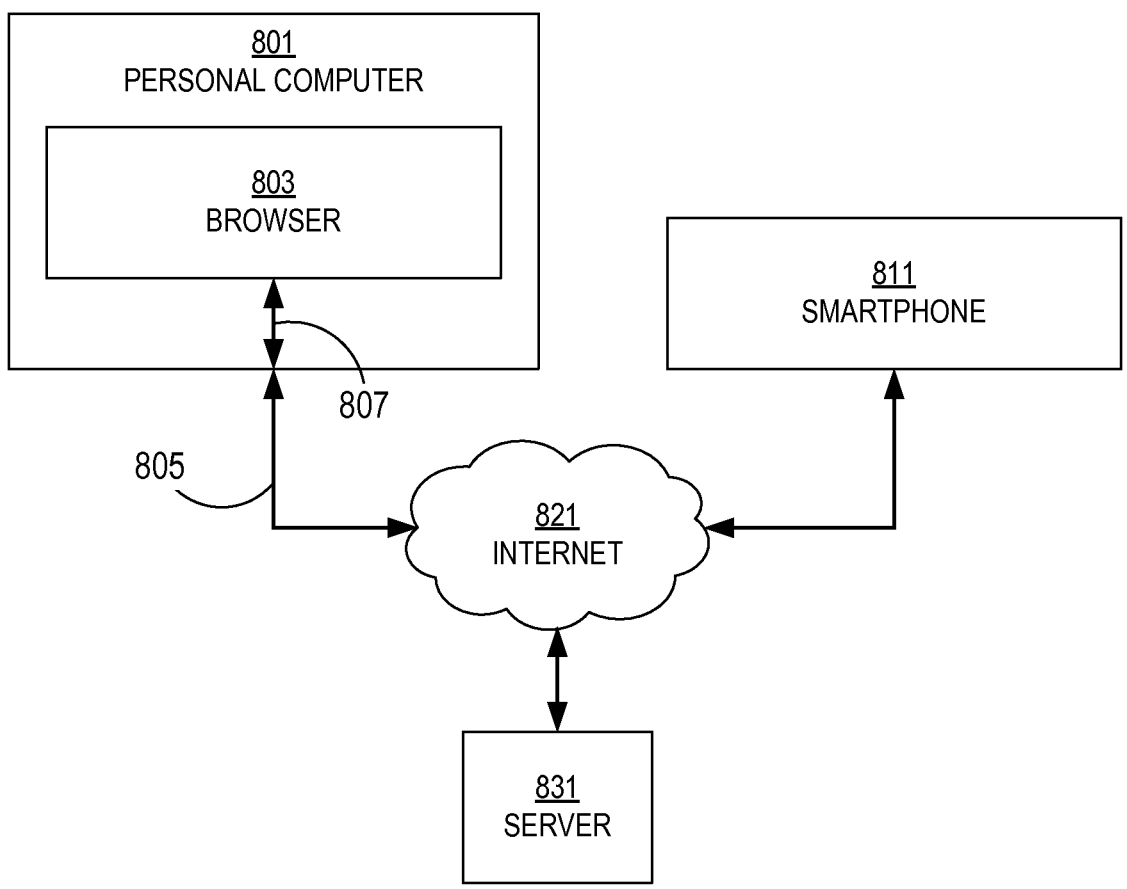
FIG. 8 conceptually illustrates a personal computer with a browser application connected to a smartphone through a network, according to an embodiment of the invention.

FIG. 8 conceptually illustrates a personal computer 801 with a browser 803. Personal computer 801 is connected to Internet 821 via a connection 805. Browser 803 relies on personal computer 801 to provide an internal connection 807 in order that browser 803 can also connect to Internet 821. A smartphone 811 is connected to Internet 821, and a server 831 connected to Internet 821 is thus accessible to both smartphone 811 and browser 803.

Figure 9A:
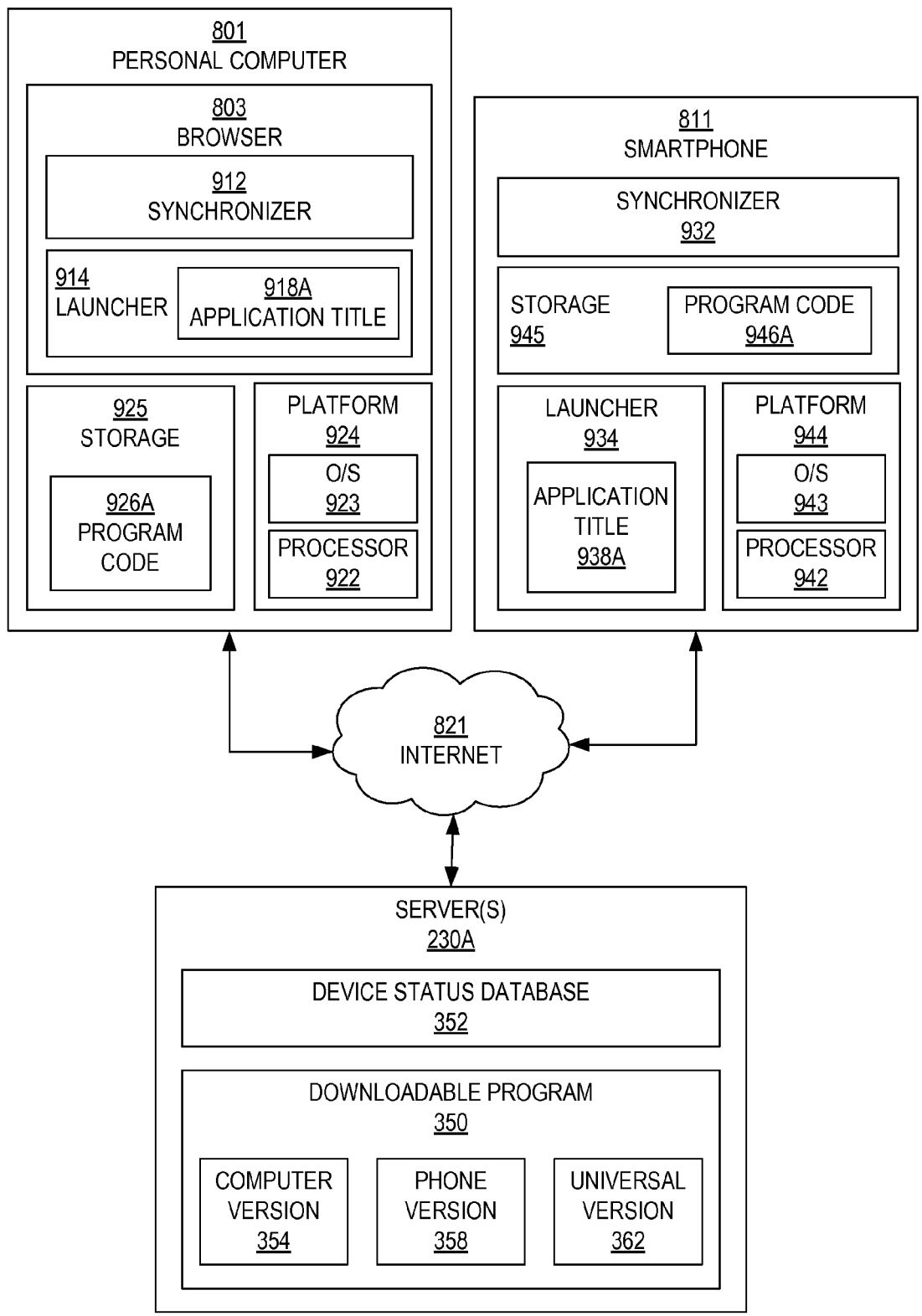
FIG. 9A is a simplified block diagram of a system according to an embodiment of the present invention.

FIG. 9A illustrates a system 900A, where application launchers on personal computer 801 and smartphone 811 are synchronized via one or more server(s) 230A.

Personal computer 801 includes a processor 922 for running programs. In this non-limiting example, processor 922 and its associated operating system ("O/S") 923 constitute a computing platform 924 for computer 801. In a similar fashion, smartphone 811 includes a processor 942 and an operating system 943, which constitute a computing platform 944 for smartphone 811.

The user uses personal computer 801 to connect with server(s) 230A for selecting and downloading to personal computer 801 a computer platform version 354 of downloadable program 350, which is further installed (possibly, upon approval of the user) and becomes available to run on processor 922, while the application title 918A that corresponds to the downloaded program added to launcher 914 in browser 803. In a related embodiment of the invention, launcher 914 is a toolbar of browser 803, as disclosed herein. The installation process of program code 926A and application title 918A in browser 803 also involves an update of device status database 352 that is now aware that the current application is installed on personal computer 801. Such update is carried out either automatically by server(s) 230A upon providing the application for download, or is made upon the initiative of application synchronizer 912 which insures the synchronization between the applications downloaded to personal computer 801 and the status of launcher 914 of browser 803 in device status database 352. In a related embodiment, application synchronizer 912 is embedded in browser 803.

According to various embodiments of the invention, application synchronizer 932 of smartphone 811 is activated in any of the following cases: (i) upon smartphone 811 being turned on; (ii) by receiving a command from the user; or (iii) by periodic polling during continuous background operation when smartphone 811 is on. When application synchronizer 932 is activated, it communicates with device status database 352 on server(s) 230A and checks whether there is a need to update launcher 934 of smartphone 811 as a result of a corresponding update to any of the other computing devices of the user (in this case—an update of launcher 914 of browser 803). If application synchronizer 912 identifies a need for update, it activates the download of phone platform version 358 to smartphone 811, which causes, possibly after receiving the user's approval, the corresponding application title 938A to be added to launcher 934 of smartphone 811. Then, immediately or upon the first time that application title 938A is opened by the user, the corresponding program code 946A will be added to a nonvolatile (non-transitory) storage device 945 of smartphone 811, ready to run on processor 942.

The user of the system 900A of FIG. 9A may alternatively use his or her smartphone 811 to select a certain application for downloading from server(s) 230A, and the process described above will be carried out as described above in this section while smartphone 811 and personal computer 801 swap roles. Thus, downloading the application to smartphone 811 will cause an update to device status database 352, which will cause application synchronizer 912 of personal computer 801 to download the respective computer platform version 354 of downloadable program 350 from server(s) 230A and add program code 926A to a nonvolatile (non-transitory) storage device 925 of personal computer 801 and application title 918A to launcher 914. In a related embodiment of the invention, application synchronizer 912 is part of browser 803.

Depending on the operating systems and computing environments of personal computer 801 and smartphone 811, it is possible that instead of having different computer platform version 354 and phone platform version 358, a single universal platform version 362 will be provided as both program code 926A and program code 946A, for example using code written in Java®. In this case, computer platform version 354 and phone platform version 358 may become redundant and be eliminated.

A synchronizer, such as synchronizer 912 and 932, can be an agent installed in the computing device, such as computer 801 and smartphone 811, respectively. In such cases, the agent works in cooperation with a program running on a server, such as server(s) 230A.

Figure 9B:
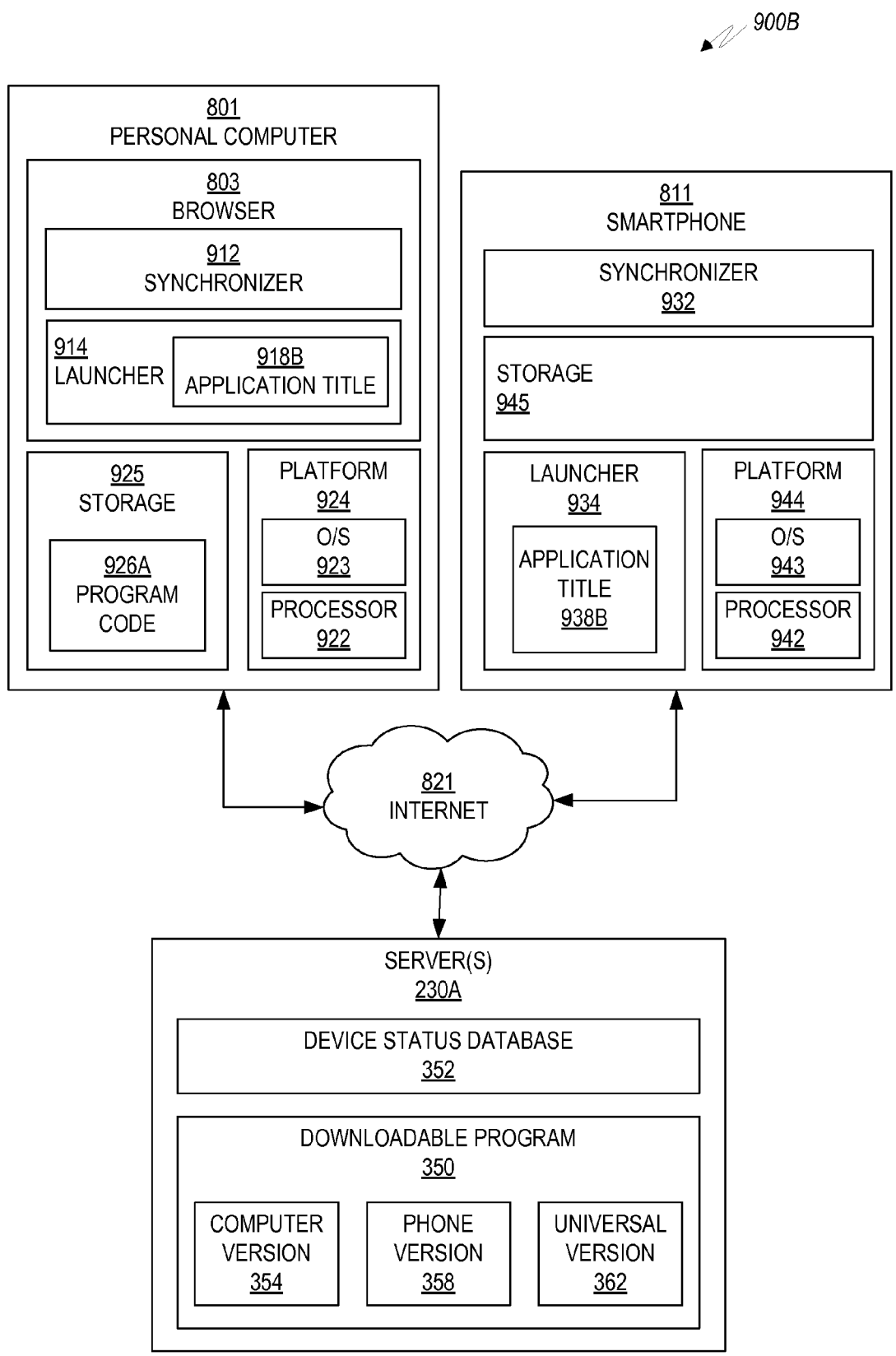
FIG. 9B is a simplified block diagram of a system according to another embodiment of the present invention.

FIG. 9B illustrates a system 900B according to another embodiment that operates similarly to system 900A of FIG. 9A, except that program code 946A is not automatically downloaded by application synchronizer 932 upon synchronization, but only application title 938B is downloaded and added to launcher 934. Thus, the user who uses computer 801 to download from server(s) 230A either computer platform version 354 or universal platform version 362 and install it as program code 926A and application title 918B, causes an update to device status database 352, which causes application synchronizer 932 of smartphone 811 to download and install application title 938B, without installing the corresponding program code 946A as in FIG. 9A. Only when the user selects and opens application title 938B for the first time will the corresponding program code be downloaded from server(s) 230A and become locally available on smartphone 811 as in the embodiment of FIG. 9A.

An advantage of the embodiment of FIG. 9B over that of FIG. 9A is in that it allows automatic update of launcher 934 by the addition of application title 938B without requesting the user to approve the installation. For security reasons, automatic download of program code is normally considered risky and therefore requires explicit user approval, while merely providing a link for such a download, in the form of application title 938B, is not considered as risky and can be allowed to proceed automatically. Thus, while application title 938B may look identical or similar before and after the actual program code is downloaded, its role actually changes from a download link to a program execution button when the user selects and opens application title 938B.

Figure 9C:
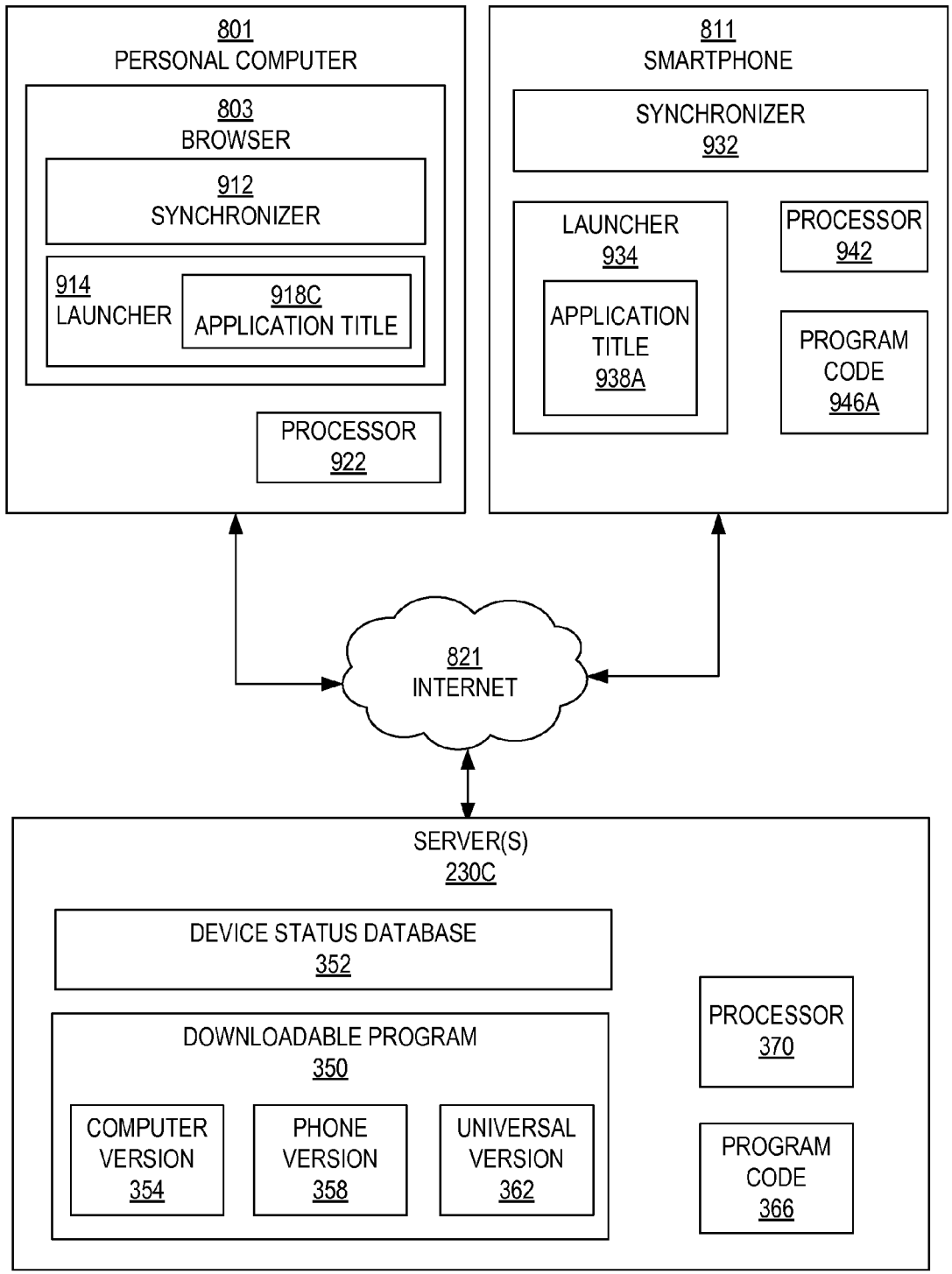
FIG. 9C is a simplified block diagram of a system according to an additional embodiment of the present invention.

FIG. 9C illustrates a system 900C according to an embodiment that synchronizes applications running on personal computer 801 and smartphone 811 via server(s) 230C. The operation of system 900C is similar to the operation of system 900A of FIG. 9A, except that server(s) 230C includes program code 366 that runs on a processor 370 for providing the user of personal computer 801 the functionalities related to application title 918C via browser 803. In other words, the user of computer 801 selects and opens application title 918C, and then runs the respective program as a Web application.

Thus, the user who owns both personal computer 801 and smartphone 811 may download a new application in one or two alternative methods according to the present disclosure:

According to the first method, the user uses smartphone 811 to download the selected application title 938A and program code 946A to smartphone 811, which causes device status database 352 to be updated and further initiates the update of launcher 914 (toolbar of browser 803) to include the corresponding application title 918C (toolbar button) for allowing the user to run program code 366 on processor 370 via browser 803.

In the second method, the user operates personal computer 801 to select and download a new application, whose application title 918C is in the form of an added button or icon to a toolbar (launcher 914) of browser 803. This allows the user to benefit from the functionalities corresponding to application title 918C by interfacing via browser 803 and network 224 with processor 370 of server(s) 230C, and causing processor 370 to execute program code 366 and return results to browser 803. Upon downloading application title 918C, which is actually a toolbar button that includes a link to program code 366 on server(s) 230C, device status database 352 is updated, thereby causing application synchronizer 932 of smartphone 811 to download phone platform version 358 (or universal platform version 362) of downloadable program 350, as in the case of FIG. 9A.

The embodiment of FIG. 9C allows the user to use a web application via the browser of his personal computer, benefiting from the high reliability and low (or zero) variable cost of the Internet connection, while a corresponding application (possibly with a reduced set of functionalities) runs as a standalone application on his smart mobile phone even when an Internet connection is unavailable (e.g. during flights), unreliable, or expensive (e.g., when roaming).

Figure 10A:
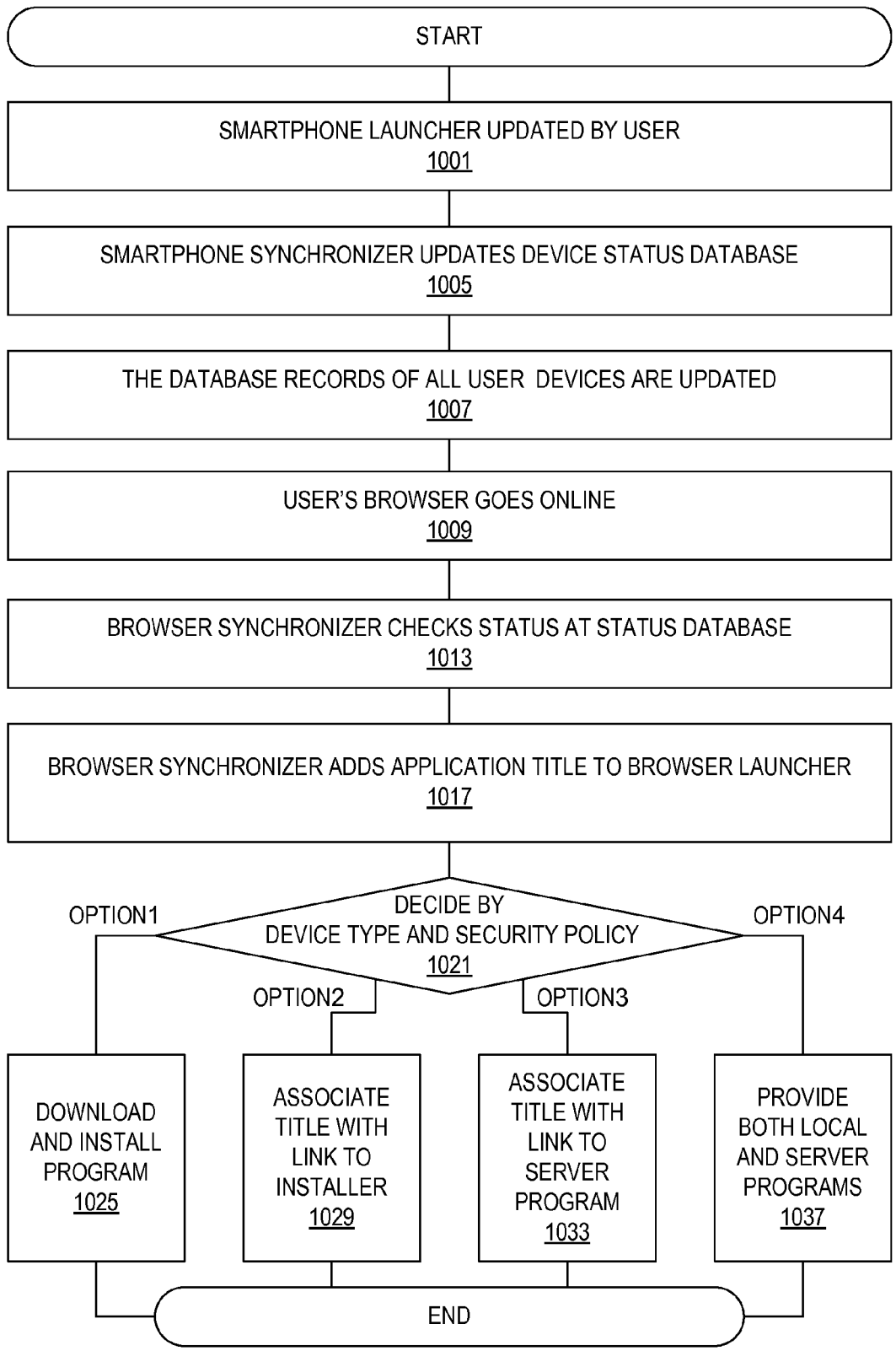
FIG. 10A is a simplified flowchart describing the synchronization of a browser and a smartphone according to an embodiment of the present invention.

FIG. 10A is a flowchart illustrating a mode of operation provided by an additional embodiment of the present invention, which relates to synchronization between a user's smartphone and a browser running in the user's personal computer. In step 1001 the user updates his or her smartphone, by installing a new application, thereby adding the respective application title to a launcher of the smartphone. The installation may also include downloading the respective program code and storing it in a nonvolatile storage device of the smartphone, ready to load and execute on the processor of the smartphone. In step 1005 smartphone synchronizer 932 (FIGS. 9A-9C) is aware of the update and communicates with computing device status database 352 to add the new installed application to the smartphone's record in the database. In step 1007 the server that hosts computing device status database 352 updates the records of all computing devices of the user that are registered in computing device status database 352 about the application added to the smartphone. In step 1009, browser 803 (FIGS. 9A-9C) goes online (or has already been online upon the update of the smartphone), which causes in step 1013 browser synchronizer 912 to communicate with computing device status database 352 and check the browser's record in device status database 352, which notifies browser 803 about the update, and which causes browser synchronizer 912, in step 1017, to add the application title to browser launcher 914.

In a step 1021, browser synchronizer 914 selects one of the options 1-4, depending on browser 803 security policy, as well as by the nature of the installed program. Option 1 leads to a step 1025, in which the respective program code, which matches browser 803, is downloaded and installed in storage device 925 of personal computer 801, in which browser 803 is running Option 1 is generally suitable when offline operability is needed and where security provisions (e.g. validating the downloaded programs as trusted by a digital signature) afford automatic installation. Under option 2, a step 1025 associates the application title with a link to an installer program, whose code is either downloaded and stored in storage 925, or is kept on a remote server; in both cases, the first time the user opens the application title via a browser 803, the user is notified about the forthcoming installation, and can decline, postpone or approve the installation; after the installation, the application title turns into a program-running button in a toolbar of browser 803. Under option 3, which leads to a step 1033, the program title in the installer is a link to a web application hosted on a remote server, where browser 803 serves as an input and output interface for the user. Option 4 leads to a step 1037, where both dedicated local code and a remote server program will run cooperatively, for example in a multiplayer Internet game, where a local program manages graphic processing while the game rules and steps run on the server. In step 1037, the local code may be downloaded automatically (as in step 1025), or through a two-step process that prompt the user for approval upon the first time the application is opened using browser 803 (as in step 1029).

Figure 10B:
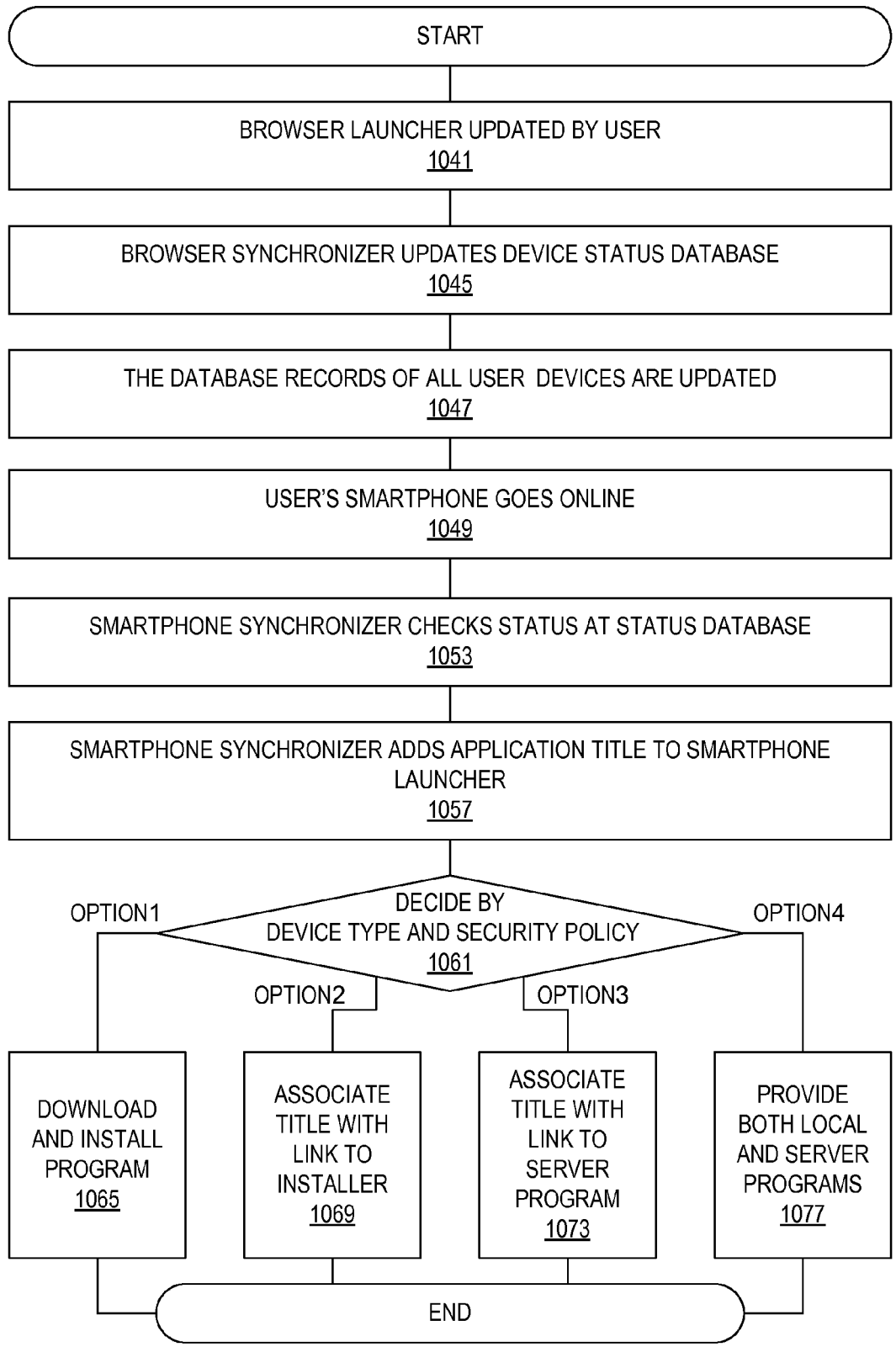
FIG. 10B is a simplified flowchart describing the synchronization of a browser and a smartphone according to another embodiment of the present invention.

FIG. 10B is a flowchart illustrating a mode of operation provided by a further embodiment of the present invention, which relates to synchronization between a user's browser running in the user's personal computer and the user's smartphone. In step 1041 the user updates his or her browser, by installing a new application, thereby adding the respective application title to a launcher of the personal computer. The installation may also include downloading the respective program code and storing it in a nonvolatile storage device of the personal computer, ready to load and execute on the processor of the personal computer. In step 1045 browser synchronizer 912 (FIGS. 9A-9C) is aware of the update and communicates with computing device status database 352 to add the new installed application to the browser's record in the database. In step 1047 the server that hosts computing device status database 352 updates the records of all computing devices of the user that are registered in computing device status database 352 about the application added to the browser. In step 1049, smartphone 811 (FIGS. 9A-9C) goes online (or has already been online upon the update of the browser), which causes in step 1053 smartphone synchronizer 932 to communicate with computing device status database 352 and check the smartphone's record in device status database 352, which notifies smartphone 811 about the update, and which causes smartphone synchronizer 932, in step 1057, to add the application title to smartphone launcher 934.

In a step 1061, smartphone synchronizer 934 selects one of the options 1-4, depending on smartphone 811 security policy, as well as by the nature of the installed program. Option 1 leads to a step 1065, in which the respective program code, which matches smartphone 811, is downloaded and installed in storage device 945 of smartphone 811. Option 1 is generally suitable when offline operability is needed and where security provisions (e.g. validating the downloaded programs as trusted by a digital signature) afford automatic installation. Under option 2, a step 1065 associates the application title with a link to an installer program, whose code is either downloaded and stored in storage 945, or is kept on a remote server; in both cases, the first time the user opens the application title via smartphone 811, the user is notified about the forthcoming installation, and can decline, postpone or approve the installation; after the installation, the application title turns into a program-running button smartphone 811. Under option 3, which leads to a step 1073, the program title in the installer is a link to a web application hosted on a remote server, where smartphone 811 serves as an input and output interface for the user. Option 4 leads to a step 1077, where both dedicated local code and a remote server program will run cooperatively, for example in a multiplayer Internet game, where a local program manages graphic processing while the game rules and steps run on the server. In step 1077, the local code may be downloaded automatically (as in step 1065), or through a two-step process that prompt the user for approval upon the first time the application is opened using smartphone 811 (as in step 1069).

Figure 11:
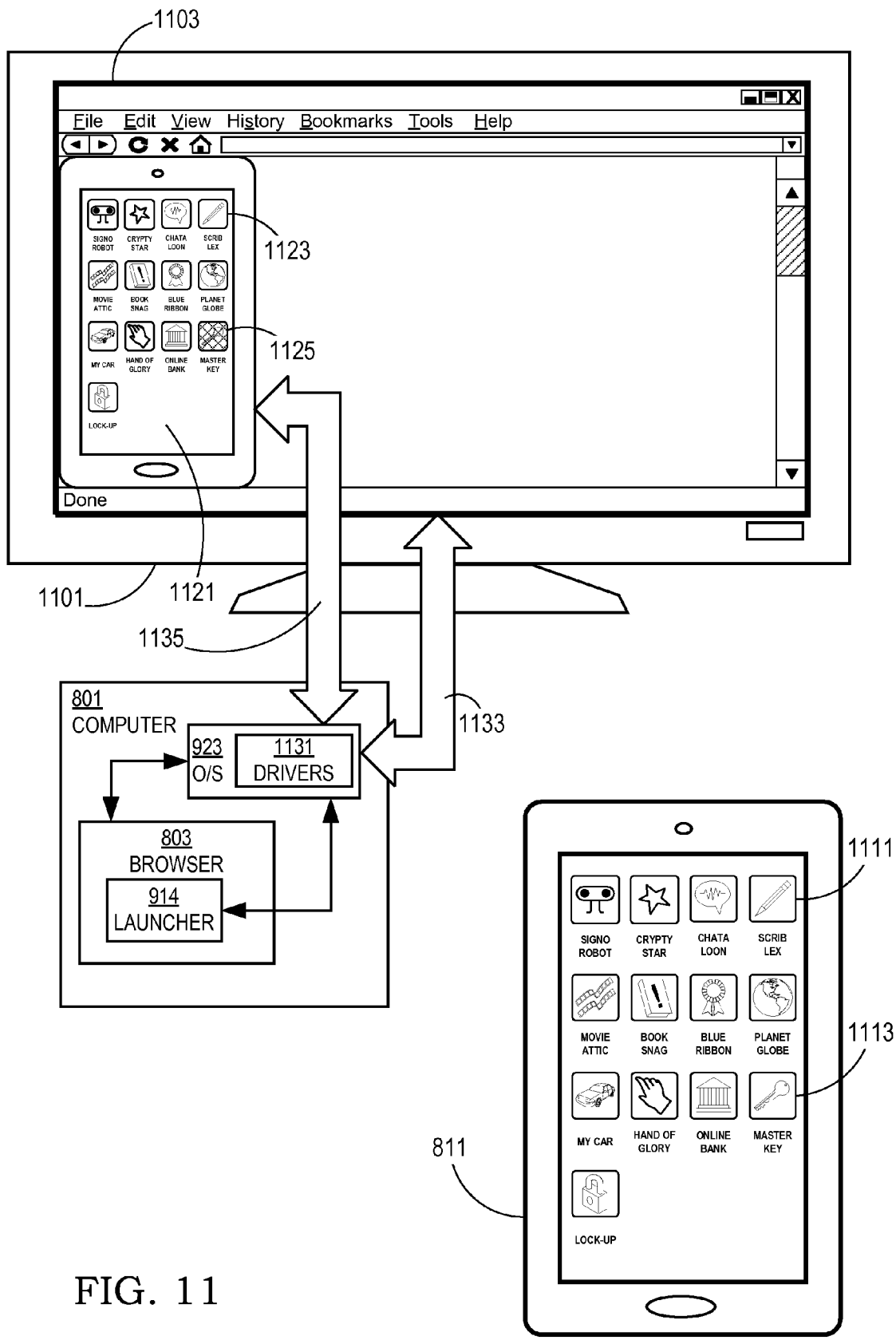
FIG. 11 conceptually illustrates a personal computer display showing a browser screen with a custom toolbar that corresponds to a smartphone, according to an embodiment of the present invention.

FIG. 11 conceptually illustrates a user's personal computer display 1101 showing a browser screen 1103 with a custom toolbar 1121 that visually corresponds to the user's physical smartphone 811, and has similar application functionality as synchronized with smartphone 811 according to an embodiment of the present invention.

In particular, browser toolbar 1121 visually resembles the screen of smartphone 811. In an embodiment of the invention, browser toolbar 1121 displays the same icons as the screen of smartphone 811. In a related embodiment, the icons on browser toolbar 1121 are arranged in the same relative positions as the corresponding icons on the screen of smartphone 811. In another related embodiment, when a new selected application title is sent to smartphone 811 and added to launcher 934, an icon (such as icon 1111) included with the new application title is also sent to smartphone 811 to be presented on the screen of smartphone 811. When browser 803 is subsequently synchronized with smartphone 811, the same application icon (such as icon 1123) is added to browser toolbar 1121.

Operating System 923 of personal computer 801 has drivers 1131, which include at least a driver for display 1101; a keyboard driver for a keyboard (not shown); and a pointing device driver for a pointing device (not shown) for receiving user input, non-limiting examples of which include a mouse with a button, a trackball with a button, a stylus device, a trackpad, and a touchscreen device incorporated into display 1101. By means of Operating System 923 and drivers 1131, browser 803 displays screen 1103 on display 1101 via a logical signal path 1133; and by means of Operating System 923 and drivers 1131, browser 803 receives user input of data and commands, such as selection, scrolling, text entry, and the like, also via logical signal path 1133. By means of Operating System 923 and drivers 1131, browser launcher 914 displays toolbar 1121 on display 1101 via a logical signal path 1135; and by means of Operating System 923 and drivers 1131 via logical signal path 1135, browser launcher 914 receives user input of commands, such as selection of an application to run, via clicking on an application icon, a non-limiting example of which is icon 1123.

In a non-limiting example, application icon 1123 in toolbar 1121 appears identical to a smartphone application icon 1111 in smartphone 811, indicating that personal computer 801 displaying browser screen 1103 and smartphone 811 have synchronized applications corresponding to application icon 1123 and application icon 1111, and, just as the user can tap on application icon 1111 to launch the application on smartphone 811, so can the user click on application icon 1123 to launch a same or similar application on personal computer 801. In another non-limiting example, an application icon 1125 in toolbar 1121 appears similar to a smartphone application icon 1113, except that icon 1125 is visually denoted as being disabled, such as by being "grayed out" (shown in FIG. 11 with cross-hatching) to indicate that the application corresponding to application icon 1125 is installed on smartphone 811, but is not installed on personal computer 801. According to a related embodiment of the invention, this condition can occur, for example, when the application corresponding to icon 1113 does not have a version compatible with Operating System 923 of personal computer 801.

An embodiment of the present invention also synchronizes browser launcher 803 when the user deletes an application title from smartphone 1105, by causing the deletion of the corresponding application title on browser launcher 803; another embodiment synchronizes smartphone launcher 934 when the user deletes an application title from browser toolbar 1121. In a related embodiment, deletion is preceded by prompting the user to confirm or decline the deletion operation. According to other related embodiments, the respective program code in personal computer 801 and/or smartphone 811 is automatically uninstalled, as applicable, when appropriate to do so.

While the description above covers a limited number of embodiments, the scope of the present disclosure extends to both combinations and sub-combinations of the various features described herein, as well as variations and modifications which are not in the prior art.

What is claimed is:

1. A method of operating at least one server for synchronizing applications between a first computing device that is based on a first computing platform and contains a first launcher for launching applications on the first computing device, and a second computing device that is based on a second computing platform and contains a second launcher for launching applications on the second computing device, wherein the first computing platform is different from the second computing platform, the method comprising:
    presenting, to the first computing device, a plurality of application titles for selection, each application title associated with respective functionalities;
    receiving, from the first computing device, a request for a selected application title of the plurality of application titles;
    sending, to the first computing device, the selected application title to be added to the first launcher, wherein the selected application title, when launched by the first launcher, is configured to execute a first application, wherein the first application is compatible with the first computing platform and is incompatible with the second computing platform, wherein the first application, when executed, is configured to provide the functionalities associated with the selected application title; and
    subsequent to the sending, automatically providing, to the second computing device, the selected application title to be added to the launcher of the second computing device, wherein the selected application title, when launched by the second launcher, is configured to execute a second application, wherein the second application is compatible with the second computing platform, wherein the second application, when executed, is configured to provide the functionalities associated with the selected application title.

2. The method of claim 1,
    further comprises supplying the first application to the first computing device;
    wherein the second computing device is configured to be connected to a remote server for running the second application, wherein a program code of the second application is stored in a non-transitory storage device of the remote server for running on a processor of the remote server to provide the functionalities associated with the selected application title.

3. The method of claim 1 further comprises: supplying the first application to the first computing device and supplying the second application to the second computing device.

4. The method of claim 1 for synchronizing an additional computing device with the first and second computing devices, the method further comprising:
    subsequent to the sending, automatically providing, to the additional computing device, the selected application title to be added to a launcher of the additional computing device.

5. A method of operating at least one server for synchronizing applications between a smartphone and a browser running on a personal computer, the method comprising:
    sending, to the smartphone, a selected application title to be added to the smartphone launcher, the application title including an application icon to be presented on a screen of the smartphone; and
    subsequent to the sending, automatically providing the application icon to the browser, to be added to a browser toolbar comprised in the browser, wherein the browser toolbar visually resembles the appearance of the screen of the smartphone, wherein the browser toolbar is configured for providing functionalities associated with the application title responsive to launching the application title using the application icon;
    whereby applications in the smartphone and the browser are synchronized.

6. The method of claim 1, wherein the second application is automatically selected from a group of applications based on a security policy defined for the second computing device, wherein the group of applications comprise a plurality of applications, each of which is compatible with the second computing platform and, when executed, is configured to provide the functionalities associated with the selected application title.

7. The method of claim 6, wherein the selection of the second application is performed by the second computing device.

8. The method of claim 6, wherein the group of applications comprise at least two of the following:
    an application to be downloaded and installed on the second computing device;
    an on-demand application to be installed upon first time launching of the second application title by the second launcher; and
    a web application that is executed in response to a launching of the second application title by the second launcher.

9. The method of claim 5, wherein the browser toolbar comprises a mock-up of the smartphone imitating a physical design thereof.

* * * * *